US011652858B2

(12) United States Patent
Walling et al.

(10) Patent No.: US 11,652,858 B2
(45) Date of Patent: May 16, 2023

(54) INTEGRATION OF COMMUNICATION PLATFORM FUNCTIONALITY WITH A THIRD-PARTY APPLICATION

(71) Applicant: Salesforce, Inc., San Francisco, CA (US)

(72) Inventors: Steven Walling, Portland, OR (US); Andrew Fong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/348,146

(22) Filed: Jun. 15, 2021

(65) Prior Publication Data

US 2022/0400138 A1    Dec. 15, 2022

(51) Int. Cl.
*H04L 65/403*    (2022.01)
*H04L 67/53*    (2022.01)
*G06F 3/0484*    (2022.01)

(52) U.S. Cl.
CPC .......... *H04L 65/403* (2013.01); *G06F 3/0484* (2013.01); *H04L 67/53* (2022.05)

(58) Field of Classification Search
CPC ....... H04L 65/403; H04L 67/20; G06F 3/048; G06F 3/0484
See application file for complete search history.

(56) References Cited

U.S. PATENT DOCUMENTS

| 2009/0013413 | A1* | 1/2009 | Vera | G06F 21/6263 726/30 |
| 2009/0031301 | A1* | 1/2009 | D'Angelo | G06F 8/60 717/178 |
| 2012/0317501 | A1* | 12/2012 | Milou | G06Q 10/101 715/753 |
| 2013/0132861 | A1* | 5/2013 | Kienzle | G06Q 10/10 715/753 |
| 2013/0263021 | A1 | 10/2013 | Dunn et al. | |
| 2013/0293664 | A1 | 11/2013 | Tsang et al. | |
| 2014/0006977 | A1* | 1/2014 | Adams | H04L 51/32 715/753 |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Nhat Huy T Nguyen
(74) *Attorney, Agent, or Firm* — Lee & Hayes, P.C.

(57) ABSTRACT

Embedding functionality of a communication platform into a third-party application is described. The communication platform can receive, from the third-party application, a request to connect to the communication platform, wherein the third-party application and the communication platform are associated with a user account. In response to receiving the request, causing an embedded user interface associated with the communication platform to be presented via a user interface of the third-party application. In an example, data input in the embedded user interface can be presented via a group-based communication user interface of the communication platform.

20 Claims, 15 Drawing Sheets

(56) References Cited

U.S. PATENT DOCUMENTS

2018/0287982 A1 10/2018 Draeger et al.
2022/0400139 A1 12/2022 Walling et al.

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut us all Some Slack", Readwriteweb, Lexisnexis, https://advance.lexis.com/api/permalink/33dd79e2-90f5-409d-ae27-5a2c7e86bf31/?context=1000516>. (dated Aug. 14, 2 013, 4:15 PM) 3 pages.

Robert Hof, "Stewart Butterfield on How Slack Became A $2.8 Billion Unicorn", Forbes, [online][retrieved May 9, 2019]. Retrieved from the Internet: <URL https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9Md7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.

Ernie Smith, "Picking up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

Office Action for U.S. Appl. No. 17/492,278, dated Dec. 8, 2022, Walling, "Integration of Communication Platform Functionality With a Third-Party Application", 9 pages.

\* cited by examiner

500

```
┌─────────────────────────────────────────────────────────────────┐
│ RECEIVE, FROM A THIRD-PARTY APPLICATION, A REQUEST TO CONNECT TO A │
│ COMMUNICATION PLATFORM, WHEREIN THE THIRD-PARTY APPLICATION AND THE│
│ COMMUNICATION PLATFORM ARE ASSOCIATED WITH A USER ACCOUNT OF A   │
│ USER PARTICIPATING IN AN ACTIVE SESSION OF THE THIRD-PARTY APPLICATION │
│                               502                                │
└─────────────────────────────────────────────────────────────────┘
                                 ↓
┌─────────────────────────────────────────────────────────────────┐
│    CAUSE AN EMBEDDED USER INTERFACE ASSOCIATED WITH THE          │
│ COMMUNICATION PLATFORM TO BE PRESENTED VIA A USER INTERFACE OF THE │
│                    THIRD-PARTY APPLICATION                       │
│                               504                                │
└─────────────────────────────────────────────────────────────────┘
                                 ↓
┌─────────────────────────────────────────────────────────────────┐
│    RECEIVE, FROM THE THIRD-PARTY APPLICATION, DATA INPUT VIA THE │
│                    EMBEDDED USER INTERFACE                       │
│                               506                                │
└─────────────────────────────────────────────────────────────────┘
                                 ↓
┌─────────────────────────────────────────────────────────────────┐
│    CAUSE THE DATA TO BE PRESENTED VIA A GROUP-BASED COMMUNICATION│
│        USER INTERFACE OF THE COMMUNICATION PLATFORM              │
│                               508                                │
└─────────────────────────────────────────────────────────────────┘
```

```
CAUSE PRESENTATION OF AN INVITATION TO JOIN AN EVENT ASSOCIATED WITH
A THIRD-PARTY APPLICATION VIA A VIRTUAL SPACE OF A COMMUNICATION
PLATFORM, WHEREIN THE VIRTUAL SPACE IS ASSOCIATED WITH MEMBER(S)
                              1002
```

↓

```
RECEIVE, FROM THE THIRD-PARTY APPLICATION, AN INDICATION OF A START OF
THE EVENT, WHEREIN ONE OR MORE OF THE MEMBER(S) ASSOCIATED WITH THE
            VIRTUAL SPACE ARE ASSOCIATED WITH THE EVENT
                              1004
```

↓

```
CAUSE PRESENTATION OF AT LEAST A PORTION OF THE VIRTUAL SPACE VIA A
USER INTERFACE OF THE THIRD-PARTY APPLICATION, WHEREIN THE EVENT IS
PRESENTED VIA A FIRST SECTION OF THE USER INTERFACE AND AT LEAST THE
PORTION OF THE VIRTUAL SPACE IS PRESENTED VIA A SECOND SECTION OF THE
                          USER INTERFACE
                              1006
```

FIG. 10

INTEGRATION OF COMMUNICATION PLATFORM FUNCTIONALITY WITH A THIRD-PARTY APPLICATION

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices, allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. In some examples, the user interface can present a feed indicating messages posted to and/or actions taken with respect to a particular channel, direct message, and/or other virtual space.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 5 illustrates an example process for embedding functionality of a communication platform with a third-party application, as described herein.

FIG. 10 illustrates an example process for associating a virtual space with an event of a third-party application, as described herein.

DETAILED DESCRIPTION

Figure 1:
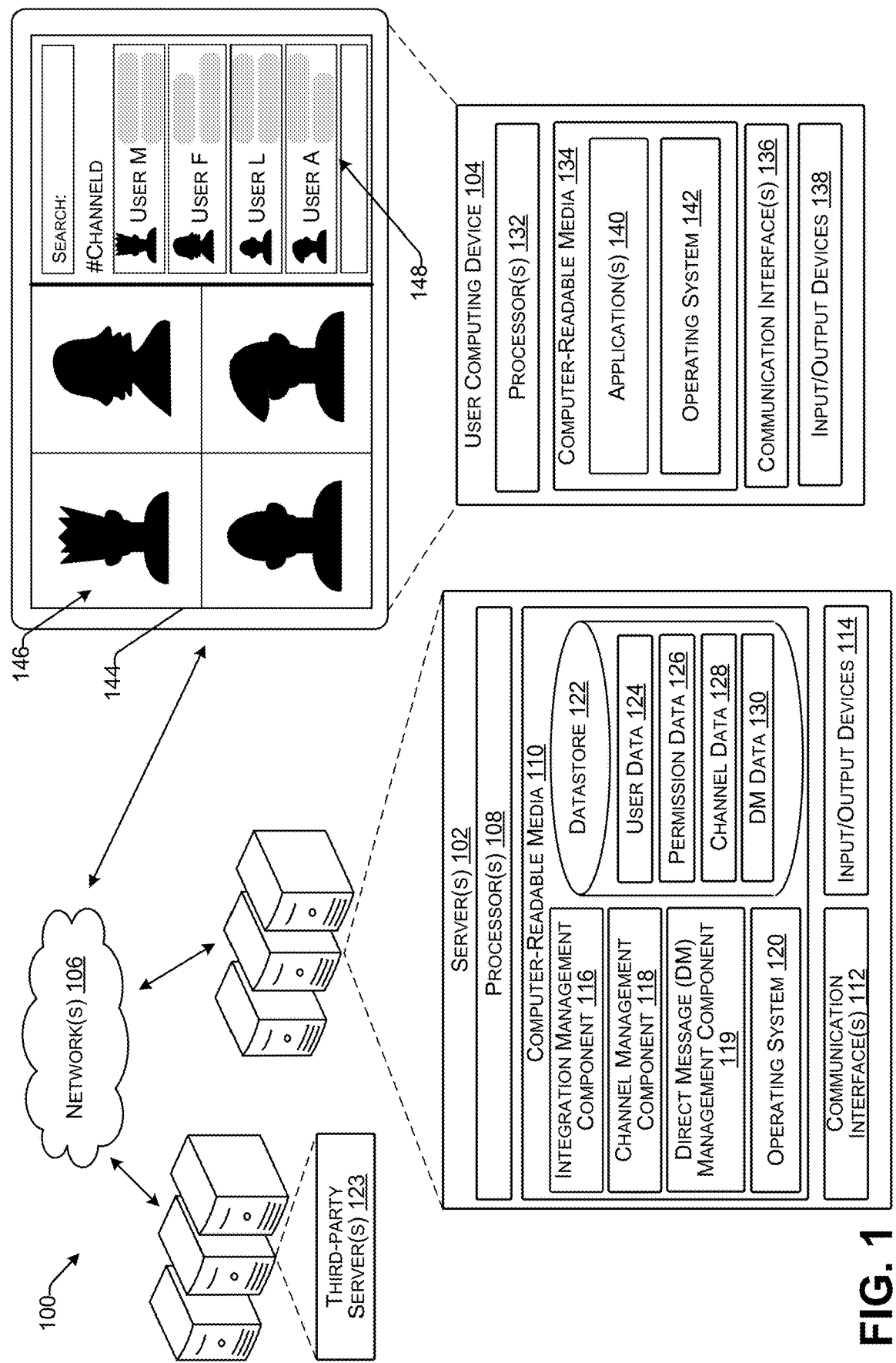
FIG. 1 illustrates an example environment for performing techniques described herein.

Integrating functionality of a communication platform into a third-party application is described. The communication platform, which, in some examples can be a group-based communication platform, a channel-based communication platform, a permission-based communication platform, a channel-based messaging platform, and/or any other platform for facilitating communication between and among users, can enable users to exchange messages and/or other data via the communication platform. In some examples, users using the communication platform for exchanging messages and/or other data can use an application of another, third-party platform (e.g., a third-party application) for various purposes, such as for video conferencing, collaborative editing, etc. Techniques described herein relate to a lightweight, embedded version of a communication platform that can be integrated into third-party applications to enable users to use functionality of the communication platform from within the third-party applications, without switching context or otherwise leaving the third-party applications. That is, techniques described herein relate to the integration of functionality associated with the communication platform into third-party applications so that users can participate in events associated with third-party applications and exchange messages and/or other data via functionality associated with the communication platform from within the third-party applications.

In existing techniques, when a user is interacting with a third-party application, the user is required to leave the third-party application and access a virtual space associated with the communication platform via another application and/or a web browser. In such existing techniques, the user is required to switch back and forth between the third-party application and the application and/or web browser providing communication platform functionality. When the user switches back and forth, the user loses context associated with the event and/or the virtual space. As such, existing techniques result in fragmented conversations and provide poor user experiences. Further, when the user switches back and forth, the user is required to toggle between multiple display windows (e.g., the third-party application and application and/or web browser providing communication platform functionality) or interact with multiple display windows. As such, existing techniques consume computing resources by presenting multiple windows on a computing device of a user. Further, existing techniques provide a less than optimal user experience as users are required to switch back and forth between computing resources.

In at least one example, users can be participating in an event (e.g., a video conference, collaborative editing of an application, etc.) associated with a third-party application and can desire to access a virtual space of the communication platform while participating in the event. As an example, a group of users can be participating in a video conference via an application of a third-party video conferencing platform. The third-party video conferencing application can have a native chat or messaging functionality. However, in existing technology, if users communicate in the native chat or messaging functionality, such conversation is not transferrable to the communication platform. Further, the users participating in the video conference can be using the communication platform to communicate with one another at the same time as the video conference, leading up to the video conference, or as a follow-up to the video conference. To use such functionality, in existing technology, the users are required to leave the third-party video conferencing application to access functionality of the communication platform (e.g., via another application and/or web browser). Techniques described herein, however, enable embedding a virtual space of the communication platform into a third-party video conferencing platform, for example, such that users participating in the video conference can message and/or exchange data via the virtual space of the communication platform from within the third-party video conferencing application. As such, messages and/or data exchanged via the virtual space prior to its embedding can be accessible to at least some of the users participating in the video conference. Further, messages and/or data exchanged via the embedded virtual space can be presented in association with the virtual space of the communication platform in real-time and can persist in the virtual space after the conclusion of the video conference. That is, users can participate in the video conference and exchange messages and/or data via the embedded virtual space, without switching context, and can access messages and/or data exchanged via the embedded virtual space via the communication platform.

As another example, a group of users can be participating in a collaborative editing session of a document via an application of a third-party collaborative editing platform. The third-party collaborative editing application can have a native chat or messaging functionality. However, in existing technology, if users communicate in the native chat or messaging functionality, such conversation is not transferrable to the communication platform. Further, the users participating in the collaborative editing sessions can be using the communication platform to communicate with one another at the same time as the collaborative editing session, leading up to the collaborative editing session, or as a follow-up to the collaborative editing session. To use such functionality, in existing technology, the users are required to exit the third-party collaborative editing application to access functionality of the communication platform. Techniques described herein, however, enable embedding a virtual space of the communication platform into a third-party collaborative editing platform, for example, such that users participating in the collaborative editing session can message and/or exchange data via the virtual space of the communication platform from within the third-party collaborative editing application. As such, messages and/or data exchanged via the virtual space prior to its embedding can be accessible to at least some of the users participating in the collaborative editing session. Further, messages and/or data exchanged via the embedded virtual space can be presented in association with the virtual space of the communication platform in real-time and can persist in the virtual space after conclusion of the collaborative editing session. That is, users can participate in the collaborative editing session and exchange messages and/or data via the embedded virtual space, without switching context, and can access messages and/or data exchanged via the embedded virtual space via the communication platform.

By embedding functionality of a communication platform (e.g., a virtual space or other object) into third-party applications, techniques described herein alleviate the need for users to switch back and forth between third-party applications and another application and/or web browser providing access to the communication platform. Such an embedding can enable users to use functionality of the communication platform from within third-party applications, without switching context or otherwise leaving the third-party applications. This can conserve computing resources by alleviating the need to run multiple applications and/or present multiple windows to enable users to participate in events and communicate via the communication platform.

As described above, in existing techniques, users can communicate via a virtual space of a communication platform prior to an event and after an event; however, to communicate via the virtual space during the event requires the user to toggle back and forth with a third-party application and an application and/or web browser providing functionality of the communication platform. If users utilize a native messaging feature associated with the third-party application, conversations via the communication platform and the third-party application are fragmented. As described above, in some examples, messages and/or other data exchanged via the embedded functionality of the communication platform can be presented via the communication platform (e.g., in a virtual space of the communication platform). That is, embedding functionality of the communication platform into third-party applications can de-fragment conversations. As such, techniques described herein, can alleviate splitting conversations across multiple platforms, leading to silos of information and unnecessary and/or extra work to share what happened in one application (e.g., the video conferencing application, the collaborative editing application, etc.) with another application (e.g., associated with the communication platform). Further, with existing techniques, each link, file, etc. shared in a third-party application has to be re-shared back to the communication platform manually to ensure no part of the conversation is lost. Techniques described herein enable links, files, etc. shared via an embedded virtual space to be automatically shared to the communication platform and stored via the communication platform. As such, techniques described herein can improve user experiences.

That is, techniques described herein enable users of a communication platform and a third-party application to message and/or otherwise collaborate with each other in virtual spaces (e.g., channels, direct messages, etc.) that they already use without needing to juggle multiple applications and/or windows. Techniques described herein, therefore, save computing resources and improve user experiences.

Additional or alternative benefits of techniques described herein are described with reference to FIGS. 1-10.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, channels, messages, and/or virtual spaces, have security (that can be defined by permissions) to limit access to defined groups of users, such as a defined group of users having, for instance, sole access to a given communication channel. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces and/or a workspace can be associated with multiple organizations.

In at least one example, the server(s) 102 can communicate with a user computing device 104 via one or more network(s) 106. That is, the server(s) 102 and the user computing device 104 can transmit, receive, and/or store data (e.g., content, messages, data, or the like) using the network(s) 106, as described herein. In some examples, the user computing device 104 can comprise a "client" associated with a user. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include an integration management component 116, a channel management component 118, a direct message management component 119, an operating system 120, and a datastore 122.

In at least one example, the integration management component 116 can manage integration of the communication platform with third-party platforms. A third-party platform, which can be associated with the third-party server(s) 123, can be external to the communication platform and can offer additional or alternative services than those offered by the communication platform. That is, the communication platform can be a "first-party platform" and the third-party platform can be external to the first-party platform, the communication platform. In an example, services of a third-party platform can be accessed via a third-party application, a web browser, or the like. In at least one example, a third-party platform can host, store, manage, or otherwise own one or more objects. An object can include a text document, an image, a video, or any other file or data item. An object created by a third-party platform can be a "third-party object" and can be hosted, stored, managed, or otherwise owned by the third-party platform. In at least one example, third-party platform can host events, such as video conference events, collaborative editing events, and/or the like.

In some examples, the integration management component 116 can facilitate integration of functionality associated with the communication platform into third-party platforms. In some examples, functionality of the communication platform can be integrated into a web browser experience associated with a third-party platform. In some examples, functionality of the communication platform can be integrated into an application associated with the third-party platform (i.e., a third-party application). In some examples, such an application can be a native application, a web application, a hybrid application, and/or the like.

In some examples, the communication platform can be integrated into a third-party platform via a small software program (e.g., an extension), as described above. In some examples, an extension can be installed into a web browser through which the third-party platform is accessible. In at least one example, the extension can cause a frame, such as an iframe, to be loaded within a web browser within which the third-party platform is accessible. In some examples, the frame can access content associated with the communication platform and write content associated therewith into the frame. In some examples, the communication platform can be associated with security restrictions that limit the ability for the communication platform to be framed into an external website (e.g., a website associated with a different domain, for example). As such, in some examples, when the frame associated with the communication platform is requested, the extension can be configured to redirect to the communication platform, which can rewrite content associated with the communication platform and the third-party platform within two frames. This can provide an experience as though the user is operating within the third-party platform, but, due to the security restrictions, can be hosted by the communication platform.

In some examples, the communication platform can be integrated into the third-party platform by embedding an embeddable browser (e.g., a webview) into a third-party application associated with the third-party platform. In such examples, the third-party application can use the embeddable browser to display web content. That is, in such examples, the third-party application can have a browser engine embedded therein that can programmatically load content (e.g., associated with the communication platform) in a user interface, as described herein. In some examples, such content can be loaded into a frame, such as an iframe.

In some examples, functionality of the communication platform can be integrated into a third-party application by one or more Software Development Kits (SDKs) and/or Application Programming Interfaces (APIs). That is, in at least one example, the communication platform can develop a set of APIs to embed functionality of the communication platform into one or more third-party applications.

In at least one example, the integration management component 116 can send and/or receive data from the third-party server(s) 123. In at least one example, a user can interact with a third-party application and/or a web browser associated with the third-party platform to generate an event. In at least one example, the third-party platform can comprise a video conferencing platform and the event can be a video conference. In at least one example, the third-party platform can comprise a collaborative editing platform and the event can comprise a collaborative editing session (e.g., where multiple users can edit a document, a graphic (e.g., a vector graphic), or other file simultaneously via their own clients). In some examples, an event can be generated by the third-party server(s) 123 and an indication of the event can be sent to the server(s) 102. The integration management component 116 can receive the indication of the event. That is, in some examples, the integration management component 116 can receive, from the third-party server(s) 123, a request to connect to the communication platform. In some examples, the request can be associated with an active session of a third-party application associated with the third-party server(s) 123. The "active session" can correspond to an event, as described above. In at least one example, a user participating in the active session and/or event can be associated with a user account of the communication platform and the third-party platform.

In at least one example, the request to connect, which can be associated with an indication of the event, can include context data including but not limited to user identifier(s) associated with the event (e.g., user(s) participating in the active session), a title of the event, a topic of the event, a description of the event, subject matter associated with the event, file(s) associated with the event, a date of the event, a time of the event, organization(s) associated with the event, group(s) associated with the event, etc. In at least one example, an event organizer (e.g., a user organizing the event) can associate one or more user identifiers of one or more users with the event. In some examples, the one or more user identifiers can comprise one or more of an email, a phone number, a username, a unique identifier, and/or the like.

In some examples, the request to connect, which can be associated with an indication of an event, can include a request to associate the event with a particular virtual space of the communication platform, such as a particular channel, direct message, board, and/or the like. In some examples, the indication of the event can include a request to generate a new virtual space to be associated with the event. In at least one example, based at least in part on receiving the indication of the event, the integration management component 116 can identify a virtual space of the communication platform to associate with the event. In some examples, if the indication of the event specifies a particular virtual space, the integration management component 116 can identify the particular virtual space to associate with the event. In some examples, if the indication of the event is associated with a request to generate a new virtual space, the integration management component 116 can interact with the channel management component 118, the DM management component 119, or the like to generate the new virtual space and can identify the new virtual space to associate with the event.

In some examples, a request to connect and/or indication of an event may not specify a particular virtual space and/or request a new virtual space be generated. In at least one example, the integration management component 116 can utilize the context data to identify a virtual space to associate with the event. In some examples, the integration management component 116 can utilize rule(s) and/or machine-trained data model(s) to analyze the context data and identify a virtual space to associate with the event.

In some examples, the integration management component 116 can utilize user identifier(s) associated with the event to identify a virtual space to associate with the event. For example, if each of the user identifier(s) associated with an event is associated with a same virtual space (e.g., as a member of the virtual space), the integration management component 116 can identify the virtual space for association with the event. In some examples, if more than a threshold number of the user identifier(s) associated with the event are associated with a virtual space, the integration management component 116 can identify the virtual space for association with the event. That is, if a subset of the user identifier(s) is associated with a virtual space and the number of user identifier(s) associated with the subset meets or exceeds a threshold, the integration management component 116 can identify the virtual space for association with the event. In some examples, if a subset of the user identifier(s) are associated with a virtual space and one or more user identifier(s) that are excluded from the subset are not associated with the virtual space, the integration management component 116 can associate the excluded user identifier(s) with the virtual space (so long as permissions allow). In some examples, the integration management component 116 can send an invitation to a client of a user associated with a user identifier that is excluded from the subset and can associate the user identifier with the virtual space in response to receiving an indication that the user accepted the invitation.

In some examples, the integration management component 116 can determine that a user identifier excluded from the subset is not associated with a user account of the communication platform. In some such examples, the integration management component 116 can initiate an onboarding process to onboard a user associated with the user identifier to the communication platform. In some examples, such an onboarding process can trigger sending of a text message, email, push notification, or other message to a client of the user, wherein the text message, email, push notification, or other message can include a link or other mechanism to facilitate onboarding. In at least one example, completion of the onboarding process can enable the integration management component 116 to generate a user account for the user and the integration management component 116 can associate the user identifier with the virtual space based at least in part on the user having a user account. In some examples, the integration management component 116 can send an invitation to a client of the user and await acceptance before associating the user identifier with the virtual space.

In some examples, the integration management component 116 can utilize additional or alternative context data associated with the event to identify a virtual space for association with the event. For example, the integration management component 116 can compare context data associated with the event with context data associated with individual of the virtual spaces of the communication platform to identify a virtual space to associate with the event. In some examples, a virtual space with a name that corresponds to a title, topic, description, etc. of the event can be identified for association with the event. In some examples, a virtual space associated with a file that is also associated with the event can be identified for association with the event.

In some examples, one or more data models can be trained using machine learning mechanisms (e.g., supervised, unsupervised, semi-supervised, etc.) to identify virtual spaces to associate with an event. In such examples, training data can include context data and/or user identifier(s) associated with previous events and context data and/or user identifier(s) associated with virtual spaces associated with the previous events. Trained data model(s) (i.e., machine-trained data model(s)) can output recommendations for virtual space(s) to associate with new event(s) (e.g., based on context data associated with such new event(s)). In some examples, a machine-trained data model can output an indication of a particular virtual space to associate with an event. In some examples, a machine-trained data model can output scores or metrics (e.g., relevance scores or relevance metrics) associated with individual virtual spaces. In some examples, the integration management component 116 can identify a virtual space based at least in part on a relevance score or a relevance metric associated therewith. For instance, a virtual space associated with a highest relevance score or relevance metric can be identified for association with the event.

In some examples, the integration management component 116 can identify multiple virtual spaces for association with an event. That is, in some examples, the context data associated with the event can be associated with multiple virtual spaces of the communication platform. In at least one example, the integration management component 116 can utilize relevance scores or relevance metrics such that a number of virtual spaces associated with the highest relevance scores or relevance metrics, relevance scores or relevance metrics above a threshold, and/or the like can be identified for association with the event.

In some examples, the integration management component 116 can cause presentation of a recommendation of one or more virtual spaces to be associated with an event via a client of a user associated with the event (e.g., the event organizer or an event participant). For example, based at least in part on receiving an indication of an event (that does not designate a particular virtual space), the integration management component 116 can analyze context data associated with the indication and generate a recommendation of one or more virtual spaces to associate with the event. In at least one example, the integration management component 116 can cause presentation of the recommendation via a user interface of a third-party application. In some examples, the recommendation can be presented via a section of the user interface that is associated with functionality of the communication platform. In some examples, the recommendation can be presented via an integration of communication platform functionality with the third-party application (e.g., via an SDK or API). In some examples, a user can interact with an affordance that enables the user to select one of the virtual spaces to associate with the event. In at least one example, the integration management component 116 can receive an indication of the selection.

In at least one example, the integration management component 116 can cause an embedded user interface associated with the communication platform to be presented via a user interface of the third-party application with which the third-party server(s) 123 are associated. In some examples, the embedded user interface can comprise a virtual space. In at least one example, based at least in part on identifying a virtual space and/or receiving a selection of a virtual space (from one or more identified virtual spaces), the integration management component 116 can associate the virtual space with the event and can cause the virtual space to be presented via the embedded user interface of the user interface of the third-party application. That is, the virtual space can be embedded in the third-party application as an embedded virtual space. In at least one example, the event can be presented via a first section of the user interface (e.g., a first frame) and at least a portion of the embedded virtual space can be presented via a second section of the user interface (e.g., a second frame). Each of the sections of the user interface can be independently interactable. As such, users associated with the event can participate in the event (e.g., the video conference, the collaborative editing session, etc.) and exchange data and/or messages via the embedded virtual space without leaving the third-party application. The embedded virtual space can be a channel, a direct message, a board, or the like. In some examples, the virtual space can be shared between two or more groups (e.g., workspaces or organizations). That is, the embedded virtual space can be any virtual space providing functionality of the communication platform.

Data and/or messages exchanged via the embedded virtual space can be presented via a group-based communication user interface associated with the communication platform. That is, data and/or messages exchanged via the embedded virtual space can be received by the integration management component 116. The integration management component 116 can communicate with the channel management component 118 and/or the DM management component 119 (or other components) to cause the data and/or messages to be presented via the virtual space of the communication platform. In some examples, the data and/or messages can be presented in a feed associated with the virtual space. In some examples, the data and/or messages can be presented as a thread associated with an object (e.g., a message) representative of the event. Data (e.g., messages and/or the like) received via the embedded user interface (e.g., embedded virtual space) can be stored by the communication platform after the event concludes. That is, the data received via the embedded user interface can persist with the communication platform after the event concludes.

In some examples, an event can be generated via an integration of the third-party platform with the communication platform. For example, a user can request to generate an event from within a virtual space of the communication platform. In at least one example, an indication of the event can be presented in association with the virtual space and, when the event is initiated within the third-party application, the virtual space from which the request to generate the event was received can be associated with the event. That is, the integration management component 116 can identify the virtual space (e.g., based at least in part on the virtual space being associated with the request to generate the event) and can cause the virtual space to be presented via a user interface of the third-party application. As described above, the virtual space can therefore be embedded in the third-party application such that users associated with the event can participate in the event (e.g., the video conference, the collaborative editing session, etc.) and exchange data and/or messages via the virtual space without leaving the third-party application.

In some examples, the integration management component 116 can facilitate cross-platform operations. For example, the embedded version of the communication platform can be associated with some limitations (e.g., it can be a light-weight version of the communication platform). As such, some functionality can be limited. However, in at least one example, based at least in part on receiving a request to perform an operation via the embedded virtual space and determining that the operation cannot be performed via the embedded virtual space, the integration management component 116 can (i) cause an indication of such to be presented via the user interface of the third-party platform (e.g., via the embedded virtual space) and/or (ii) trigger the operation to begin in the communication platform. That is, while an operation can be initiated in the embedded virtual space (e.g., associated with the third-party application), the operation can be completed via the virtual space (e.g., associated with the communication platform). As such, such an operation can be referred to as a "cross-platform operation."

In at least one example, the channel management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform, such as, for example, content and/or messages. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the channel management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 118 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or messages). In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the channel data 128. In some examples, permissions can indicate restrictions on individual channels, restrictions on user(s) associated with individual channels, and the like.

In at least one example, individual users can be associated with particular permissions, users having particular user types and/or roles (e.g., administrator users, reviewers, moderators, etc.) can be associated with particular permissions, objects (e.g., messages or otherwise) can be associated with particular permissions, virtual spaces can be associated with particular permissions, etc. That is, the permission data 126 can store various permissions for various components of the environment 100.

In at least one example, the channel data 128 can store data associated with individual channels. In at least one example, the channel management component 118 can establish a channel between and among various user computing devices, allowing the user computing devices to communicate and share data between and among each other. In at least one example, a channel identifier may be assigned to a channel, which indicates the physical address in the channel data 128 where data related to that channel is stored.

In at least one example, the DM data 130 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored.

Messages posted, or otherwise sent and/or received, via channels, direct messages, etc. can be stored in associated with the channel data 128 and/or DM data 130. In some examples, such messages can additionally or alternatively be stored in association with the user data 124.

The datastore 122 can store additional or alternative types of data, which can include, but is not limited to board data (e.g., data posted to or otherwise associated with boards of the communication platform), interaction data (e.g., data associated with additional or alternative interactions with the communication platform), model(s) (e.g., trained as described herein), etc.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include application(s) 140 and an operating system 142.

In at least one example, an application of the application(s) 140 can be a mobile application, a web application, or a desktop application. In at least one example, at least one application of the application(s) 140 can be provided by the communication platform or which can be an otherwise dedicated application. In at least one example, at least one application of the application(s) 140 can be a native application associated with the communication platform. In some examples, individual user computing devices associated with the environment 100 can have an instance or versioned instance of the application, which can be downloaded from an application store, accessible via the Internet, or otherwise executable by the processor(s) 132 to perform operations as described herein. That is, the application can be an access point, enabling the user computing device 104 to interact with the server(s) 102 to access and/or use communication services available via the communication platform. In at least one example, the application can facilitate the exchange of data between and among various other user computing devices, for example via the server(s) 102.

In at least one example, at least one application of the application(s) 140 can be provided by a third-party platform (e.g., associated with the third-party server(s) 123). The third-party application can be an access point, enabling the user computing device 104 to interact with the third-party server(s) 123 to access and/or use services available via the third-party platform. In at least one example, the third-party application can facilitate the exchange of data between and among various other user computing devices, for example via the third-party server(s) 123.

Additional or alternative access points, such as a web browser, can be used to enable the user computing device 104 to interact with the server(s) 102 and/or the third-party server(s) 123 as described herein. That is, in examples where an application is described as performing an operation below, in an additional or alternative example, such an operation can be performed by another access point, such as a web browser or the like.

In at least one example, the application(s) 140 can present user interfaces, as described herein. In at least one example, a user can interact with the user interfaces via touch input, keyboard input, mouse input, spoken input, or any other type of input. Examples of user interfaces that can be presented by the application(s) 140 are described below.

In at least one example, the user computing device 104 can correspond to a "client" of a user. In some examples, the user computing device 104 can be associated with multiple "clients," in which case, each instance of an application or other access point can be its own client. For example, a user can be signed into a first client (e.g., the application(s) 140) and a second client (e.g., a web browser), both of which can be associated with the user computing device 104. In another example, the user can be signed into a first client (e.g., the application(s) 140) and a second client, each of which can be on separate user computing devices.

As described above, a client, which can be associated with the user computing device 104, can present one or more user interfaces. A non-limiting example of a user interface 144 is shown in FIG. 1. In at least one example, the user interface 144 can be presented by the third-party application, which for illustrative purposes, is shown as a video conferencing application. As illustrated in FIG. 1, a first section 146 of the user interface 144 can present an event (e.g., a video conference) that can be associated with one or more users. For the purpose of this discussion, "presenting an event" can comprise presenting data associated with the event such that users can participate in the event. In at least one example, the user interface 144 can include a second section 148 that can present a virtual space of the communication platform. For the purpose of this discussion, "presenting a virtual space" can comprise presenting data associated with the virtual space such that users can send and/or receive messages and/or other data via the virtual space which is "embedded" in the third-party application. In at least one example, a user of the user computing device 104 can participate in the event (e.g., the video conference) and exchange messages and/or other data via the same user interface 144, without leaving the third-party application. Additional details are provided below.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the integration management component 116, the channel management component 118, the direct message management component 119, and the application(s) 140, techniques described herein can be performed by any other component, or combination of components, which can be associated with the server(s) 102, the user computing device 104, or a combination thereof.

Figure 2A:
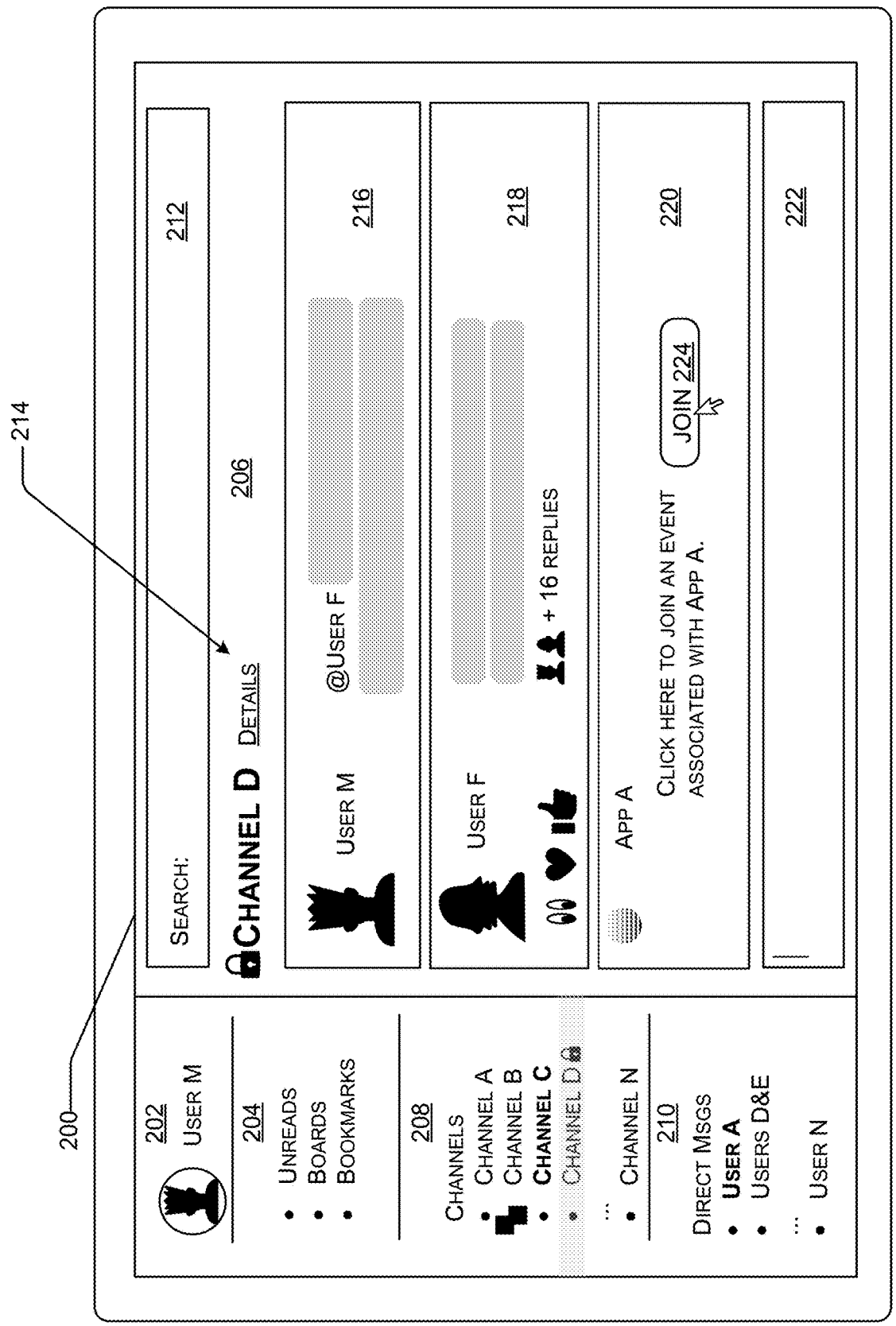
FIG. 2A illustrates an example user interface, from which a user can join an event associated with a third-party platform, as described herein.

FIG. 2A illustrates an example user interface 200 presented via a communication platform, as described herein. In some examples, a user interface 200 presented via the communication platform can include a first section 202 (e.g., which can be a portion, pane, or other partitioned unit of the user interface 200) that includes user interface element(s) representing virtual space(s) associated with the workspace(s) with which the user (e.g., account of the user) is associated. In at least one example, the first section 202 can include one or more sub-sections, which can represent different virtual spaces. For example, a first sub-section 204 can include user interface elements representing virtual spaces that can aggregate data associated with a plurality of channels and/or workspaces. In at least one example, each virtual space can be associated with a user interface element in the first sub-section 204. In some examples, a user interface element can be associated with an actuation mechanism, that when actuated, can cause an application of the application(s) 140 (e.g., an application associated with the communication platform) to present data associated with the corresponding virtual space via a second section 206 (which can be a portion, pane, or other partitioned unit of the user interface 200) of the user interface 200.

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 206, for example in a feed. In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user.

In some examples, if the first sub-section 204 includes a user interface element representative of a virtual space associated with "snippets of content" (e.g., stories) that is actuated by a user, snippets of content associated with the user, which can be associated with different channels and/or virtual spaces, can be presented via the second section 206. In some examples, such snippets of content can be presented via a feed. For the purpose of this discussion, a snippet of content can correspond to audio and/or video content provided by a user associated with the communication platform.

In another example, a virtual space can be associated with "boards" with which the user is associated. In at least one example, if the user requests to access the virtual space associated with "boards," one or more boards with which the user is associated can be presented via the user interface 200 (e.g., in the second section 206). In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project.

In some examples, data presented via the second section 206 can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of a channel) posted a message, performed an action, and/or the like. Additional details are described below.

In at least one example, the first section 202 of the user interface 200 can include a second sub-section 208 that includes user interface elements representing channels. In some examples, the channels can include public channels, private channels, shared channels (e.g., between workspaces or organizations), single workspace channels, cross-workspace channels, announcement channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 208 can depict all channels, or a subset of all channels, that the user has permission to access (e.g., as determined by the permission data 126). In such examples, the channels can be arranged alphabetically, based on most recent interaction, based on frequency of interactions, based on channel type (e.g., public, private, shared, cross-workspace, announcement, etc.), based on workspace, in user-designated sections, or the like. In some examples, the second sub-section 208 can depict all channels, or a subset of all channels, that the user is a member of, and the user can interact with the user interface 200 to browse or view other channels that the user is not a member of but are not currently displayed in the second sub-section 208. In some examples, different types of channels (e.g., public, private, shared, etc.) can be in different sections of the second sub-section 208, or can have their own sub-sections in the user interface 200. In some examples, channels associated with different workspaces can be in different sections of the second sub-section 208, or can have their own sections or sub-sections in the user interface 200.

In some examples, the indicators can be associated with user interface elements that visually differentiate types of channels. For example, Channel B is associated with a double square user interface element instead of a circle user interface element. As a non-limiting example, and for the purpose of this discussion, the double square user interface element can indicate that the associated channel (e.g., Channel B) is an externally shared channel. In some examples, such a user interface element can be the same for all externally shared channels. In other examples, such a user interface element can be specific to the other group with which the externally shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 208 of the user interface 200. In such examples, the user may navigate to a different interface (not shown) to browse additional channels that are accessible to the user but to which the user is not currently a member.

In addition to the second sub-section 208, the first section 202 can include a third sub-section 210 that can include user interface elements representative of direct messages. That is, the third sub-section 210 can include user interface elements representative of virtual spaces that are associated with private messages between one or more users, as described above.

As described above, in at least one example, the user interface 200 can include a second section 206 (e.g., which can be a section, pane, or other partitioned unit of the user interface 200) that can be associated with data associated with virtual spaces of the communication platform. In at least one example, the first section 202 and the second section 206, in combination, can be associated with a "group-based communication user interface" from which a user can interact with the communication platform.

In some examples, data presented via the second section 206 can be presented as a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user posted the message and/or performed an action.

In at least one example, a "message" can refer to any electronically generated digital object provided by a user using the user computing device 104 and that is configured for display within a channel, a direct message, and/or another virtual space as described herein. In some examples, a user can comment on a message in a "thread." A thread can be a message associated with another message that is not posted to a channel, direct message, or other virtual space, but instead is maintained within an object associated with the original message. Messages and/or threads can be associated with file(s), emoji(s), reactji(s), application(s), etc.

A channel, direct message, or other virtual space can be associated with data and/or content other than messages, or data and/or content that is associated with messages. For example, non-limiting examples of additional data that can be presented via the second section 206 of the user interface 200 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc.

In some examples, the second section 206 can comprise a feed associated with a single channel. In such examples, data associated with the channel can be presented via the feed. In at least one example, data associated with a channel can be viewable to at least some of the users of a group of users associated with a same group identifier. In some examples, for members of a channel, the content of the channel (e.g., messaging communications and/or objects) can be displayed to each member of the channel. For instance, a common set of group-based messaging communications can be displayed to each member of the channel such that the content of the channel (e.g., messaging communications and/or objects) may not vary per member of the channel. In some examples, messaging communications associated with a channel can appear differently for different users (e.g., based on personal configurations, group membership, permissions, policies, etc.).

In at least one example, the format of the individual channels or virtual spaces may appear differently to different users. In some examples, the format of the individual channels or virtual spaces may appear differently based on which workspace or organization a user is currently interacting with or most recently interacted with. In some examples, the format of the individual channels or virtual spaces may appear differently for different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification.

In FIG. 2A, the user can interact with the user interface element that corresponds to Channel D in the second sub-section 208 and as such, a feed associated with the channel can be presented via the second section 206 of the user interface 200. In some examples, the second section 206 can be associated with a header that includes user interface elements 214 representing data associated with Channel D. Furthermore, the second section 206 can include user interface elements 216, 218, and 220 which each represent messages posted to the channel. As illustrated, the user interface elements 216-220 can include an indication of a user who posted the message, a time when the message was posted, content associated with the message, reactions associated with the message (e.g., emojis, reactjis, replies etc.), and/or the like. In at least one example, the second section 206 can include an input mechanism 222, which can be associated with a composition user interface to enable a user to compose a message to be posted to the channel. That is, in at least one example, a user can provide input via the input mechanism 222 (e.g., type, speak, etc.) to generate a new message. A user can interact with the input mechanism 222 to upload a file, share a link, and/or the like. Data received via the input mechanism 222 can be associated with the virtual space (e.g., Channel D).

In at least one example, the user interface element 220 can be associated with an event hosted by a third-party platform. In some examples, a third-party application (e.g., App A) can post a message to the channel. In some examples, the message can be posted in response to receiving an indication of the event. In some examples, the third-party platform can be integrated with the communication platform such that a user can generate an event from within the communication platform. In such examples, the message can be posted in association with or in response to the user generating the event from within the communication platform.

In at least one example, the message can be associated with an affordance, which can be associated with a user interface element 224, to enable a user to join the event. In some examples, the user interface element 224 can be associated with an actuation mechanism. In at least one example, based at least in part on detecting an interaction with the user interface element 224 (e.g., actuation of the actuation mechanism), a user interface to facilitate the event can be presented via the user computing device 104. That is, actuation of an actuation mechanism associated with the user interface element 224 can enable the user to join an active session associated with the third-party application (e.g., a video conference, a collaborative editing session, etc.). In at least one example, such a user interface can be presented by the third-party application (e.g., App A) or a web browser. Additional details associated with such a user interface are described below with reference to FIGS. 3A-4.

Figure 2B:
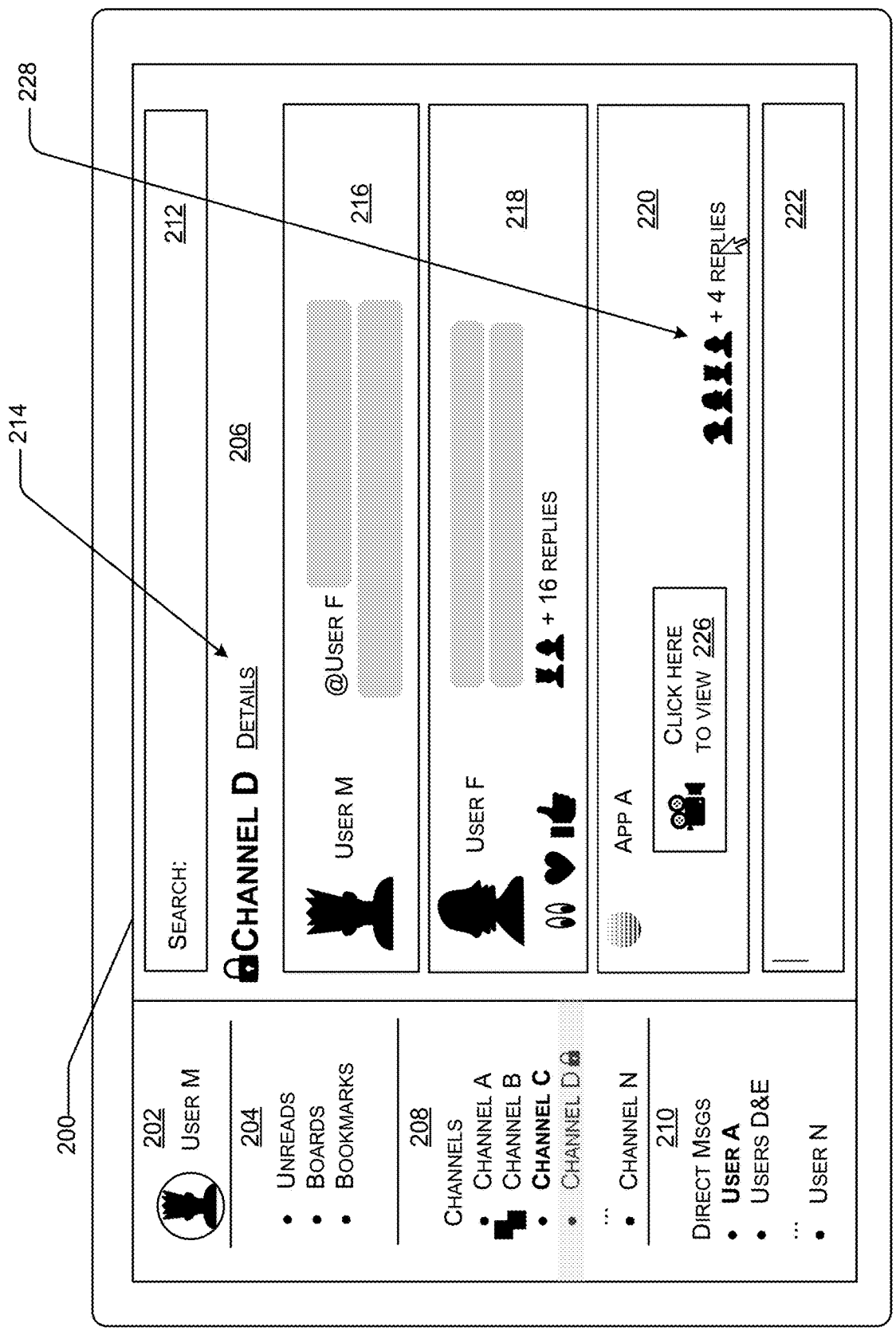
FIG. 2B illustrates another example of the user interface presented via the communication platform, as described herein, wherein data received via an embedded virtual space associated with the event is presented via the virtual space as a thread associated with an object that is representative of the event.

FIG. 2B illustrates an example of the user interface 200 wherein data associated with the event (e.g., as generated by or within the third-party application) is presented via the second section 206. In at least one example, and as described below, a user can interact with a user interface presented via a third-party application to participate in an event hosted by the third-party application and exchange messages and/or data via an embedded virtual space of the communication platform (e.g., Channel D). In at least one example, data associated with the event and/or received via the embedded virtual space can be presented via the user interface 200 of the communication platform (e.g., the group-based communication user interface). In at least one example, the user interface element 220 can be updated (e.g., during or after the event) with data received during the event. That is, in some examples, files, such as recordings, working documents, etc. can be shared back to the virtual space during or after the event has concluded. In some examples, this sharing can be automatic (e.g., without a user having to upload the files or the like). As an example, the user interface element 220 can be associated with an affordance, which can be associated with a user interface element 226, to enable a user to view a recording or other capture of the event (e.g., in an example where the event is a video conference). In another example, if the third-party application is a collaborative editing application, the user interface element 220 can be associated with an affordance to enable a user to access a document, visual, or other file that was or is currently being edited via the collaborative editing application (e.g., in association with an event).

As described above, the user interface element 220 can comprise an object representative of the event. As illustrated in FIG. 2B (and FIG. 2A), the object can be a message. In at least one example, messages and/or data received via the embedded virtual space can be associated with a thread of the message (e.g., instead of a feed of the virtual space). In at least one example, the user interface element 220 can include a thread summary indicator, which can be a user interface element 228, indicating a number of messages associated with a thread. In some examples, the thread summary indicator can identify user(s) associated with the thread, a most recent date and/or time that a message was posted to the thread, etc. In at least one example, the user interface element 228 can be associated with an actuation mechanism, actuation of which causes at least a portion of the thread to be presented via the user interface 200, as illustrated in FIG. 2C.

Figure 2C:
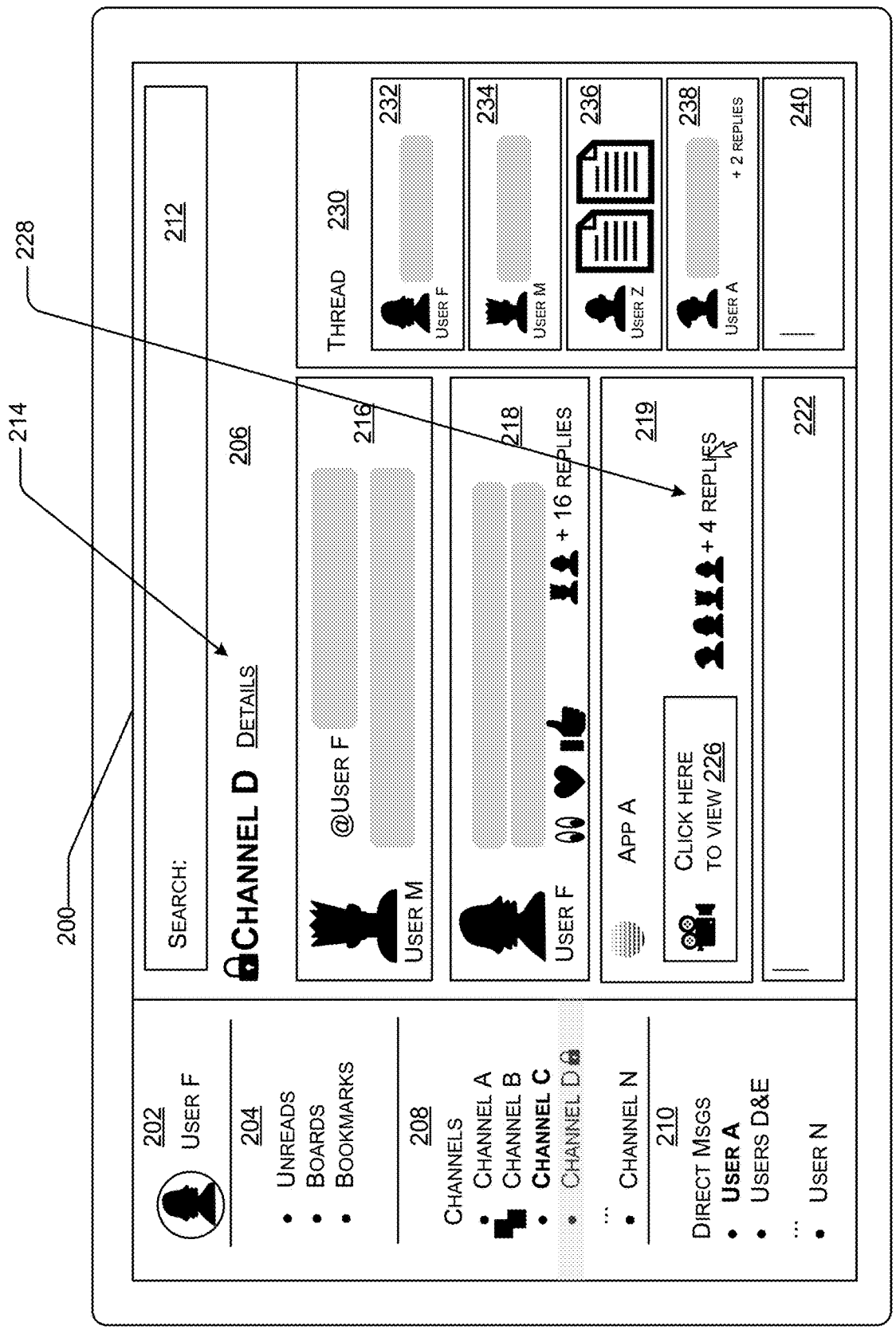
FIG. 2C illustrates another example of the user interface presented via the communication platform, as described herein, wherein data received via an embedded virtual space associated with the event is presented via the virtual space as a thread associated with an object that is representative of the event.

FIG. 2C illustrates an example of the user interface 200, wherein one or more messages and/or other data received via the embedded virtual space associated with an event are presented via a thread. In at least one example, as described above, message(s) and/or data associated with a thread can be presented in association with a message object instead of as a new message in a channel or other virtual space. In at least one example, when a thread is presented via the user interface 200, a new user interface element 230 can be presented via the user interface 200. In some examples, the user interface element 230 can be presented proximate message(s) and/or data associated with a feed, in a new subsection of the second section 206, a new section of the user interface 200, a pop-up, an overlay, or the like. As illustrated in FIG. 2C, the thread can include one or more messages and/or data exchanged via the embedded virtual space associated with the event. The user interface element 230 can be associated with one or more user interface elements 232, 234, 236, 238, which can each represent a message exchanged via the embedded virtual space. In some examples, the messages can be associated with files or other data. In at least one example, the thread can be associated with an input mechanism 240, which can enable a user to add a message to the thread. Such a message can be contained within the message object and may not be presented via the feed of the channel. In some examples, a user can scroll to view additional or alternative messages, for example, if the thread is associated with more messages than can fit within the user interface element 230.

Figure 2D:
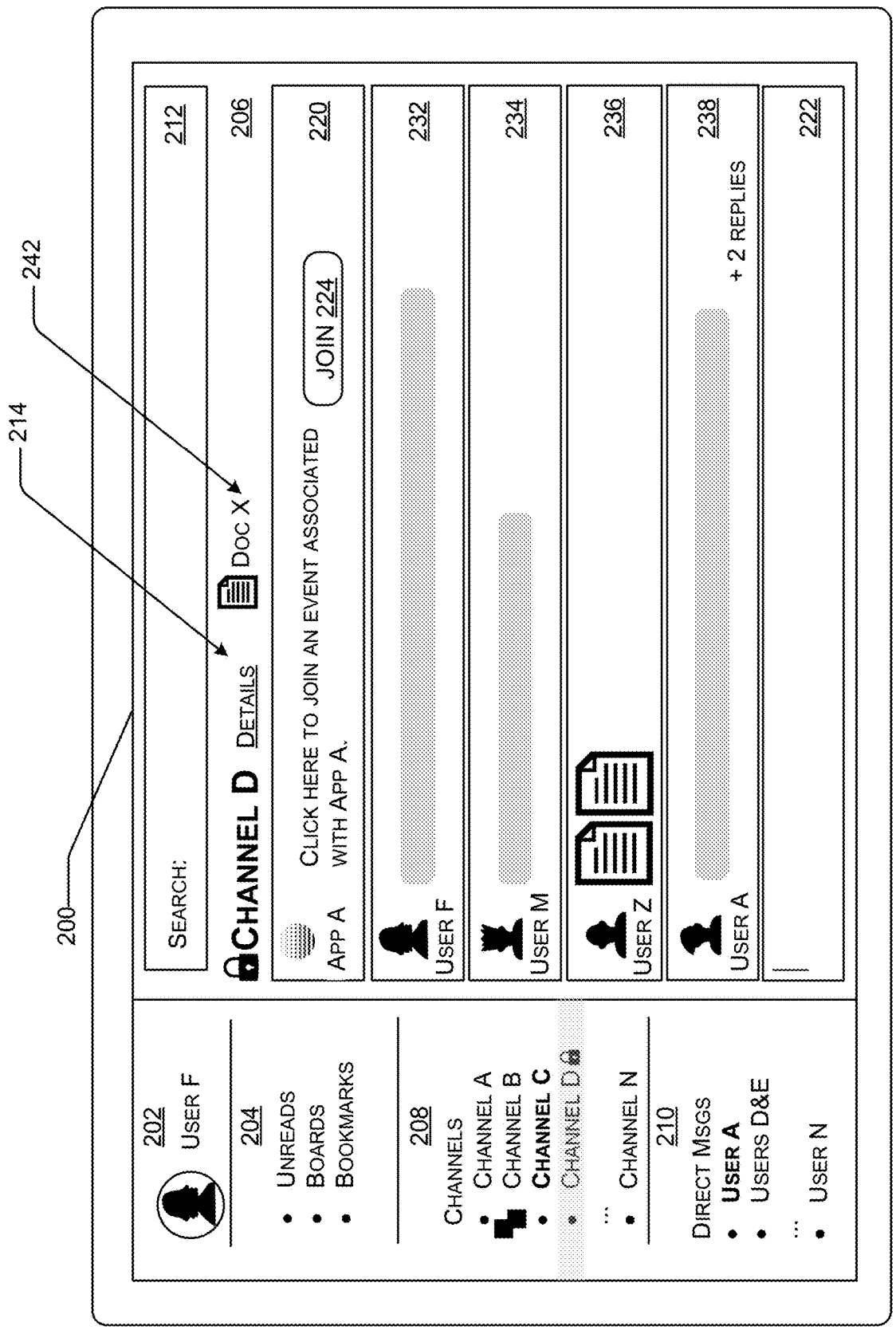
FIG. 2D illustrates another example of the user interface presented via the communication platform, as described herein, wherein data received via an embedded virtual space associated with the event is presented via the virtual space as part of a feed.

In some examples, messages and/or other data exchanged via the embedded virtual space can be presented via the feed of the virtual space, as illustrated in FIG. 2D. That is, in some examples, messages and/or other data exchanged via the embedded virtual space can be presented in the channel and/or virtual space as individual messages and/or other data. In contrast to FIGS. 2B and 2C, where the messages are presented as user interface elements 232, 234, 236, 238 in association with the user interface 230 (e.g., representative of the thread), in FIG. 2D, the messages are presented as user interface elements 232, 234, 236, 238 in the second section 206 of the user interface 200.

In some examples, applications, files, workflows, and/or the like that are the subject of the event and/or are otherwise referenced in the embedded virtual space in association with the event, can be pinned or otherwise bookmarked to a portion of the user interface 200 for quick access. As illustrated in FIG. 2D, user interface element(s) 242 can represent a document that has been pinned or otherwise bookmarked to the channel (e.g., Channel D). In some examples, the user interface element(s) 242 can be associated with a resource locator to enable quick access to the document.

Figure 3A:
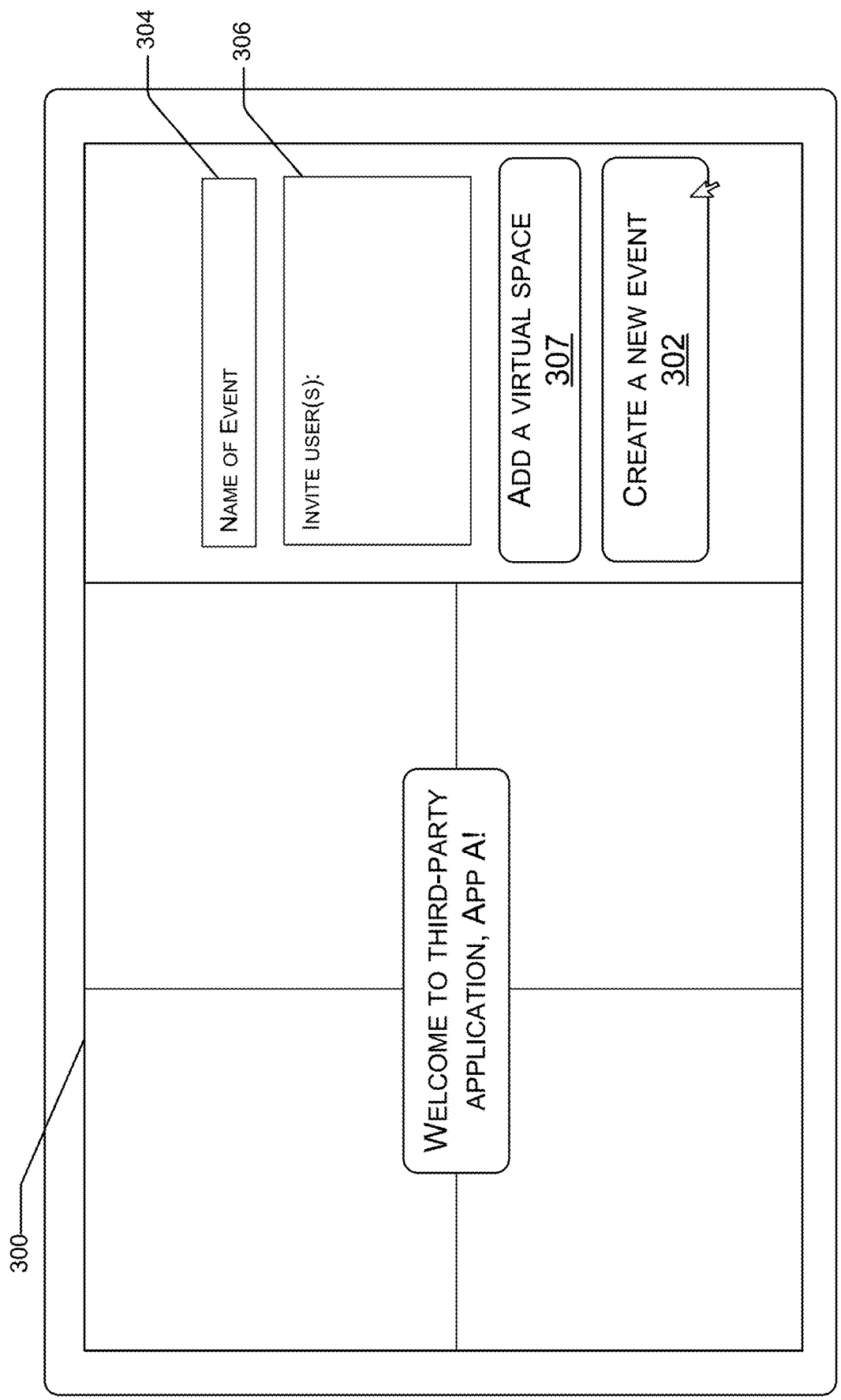
FIG. 3A illustrates an example of a user interface presented via a third-party application, as described herein, from which a user can generate and/or schedule an event.

FIG. 3A illustrates a non-limiting example of another user interface 300, which can be presented by a third-party application on the user computing device 104. As described above, in some examples, an event can be generated by the third-party application (e.g., App A, from FIG. 2A). In at least one example, the user interface 300 can include an affordance, which can be associated with a user interface element 302, to enable a user to create a new event (e.g., initiate an active session). In the example of FIG. 2A, where the third-party application is a video conferencing application, the affordance can enable a user to schedule or start a new video conference. In some examples, the user interface element 302 can be associated with an actuation mechanism. In at least one example, actuation of the actuation mechanism can cause a new event to be created and/or initiate an active session. In some examples, the user interface 300 can include one or more other affordances, which can be associated with user interface elements 304 and/or 306, for example, to enable the user to provide a name for the new event, invite user(s) to join the new event, and/or the like. That is, the user interface 300 can include one or more affordances to enable a user to input context data associated with the new event. In at least one example, the user can add user identifier(s) of user(s) to be invited to the new event. In some examples, such user identifier(s) can be email address(es), phone number(s), username(s), unique identifier(s), etc. In some examples, a user can mention or tag a virtual space as an invitee or the like to specify which virtual space is to be associated with the event.

Figure 3B:
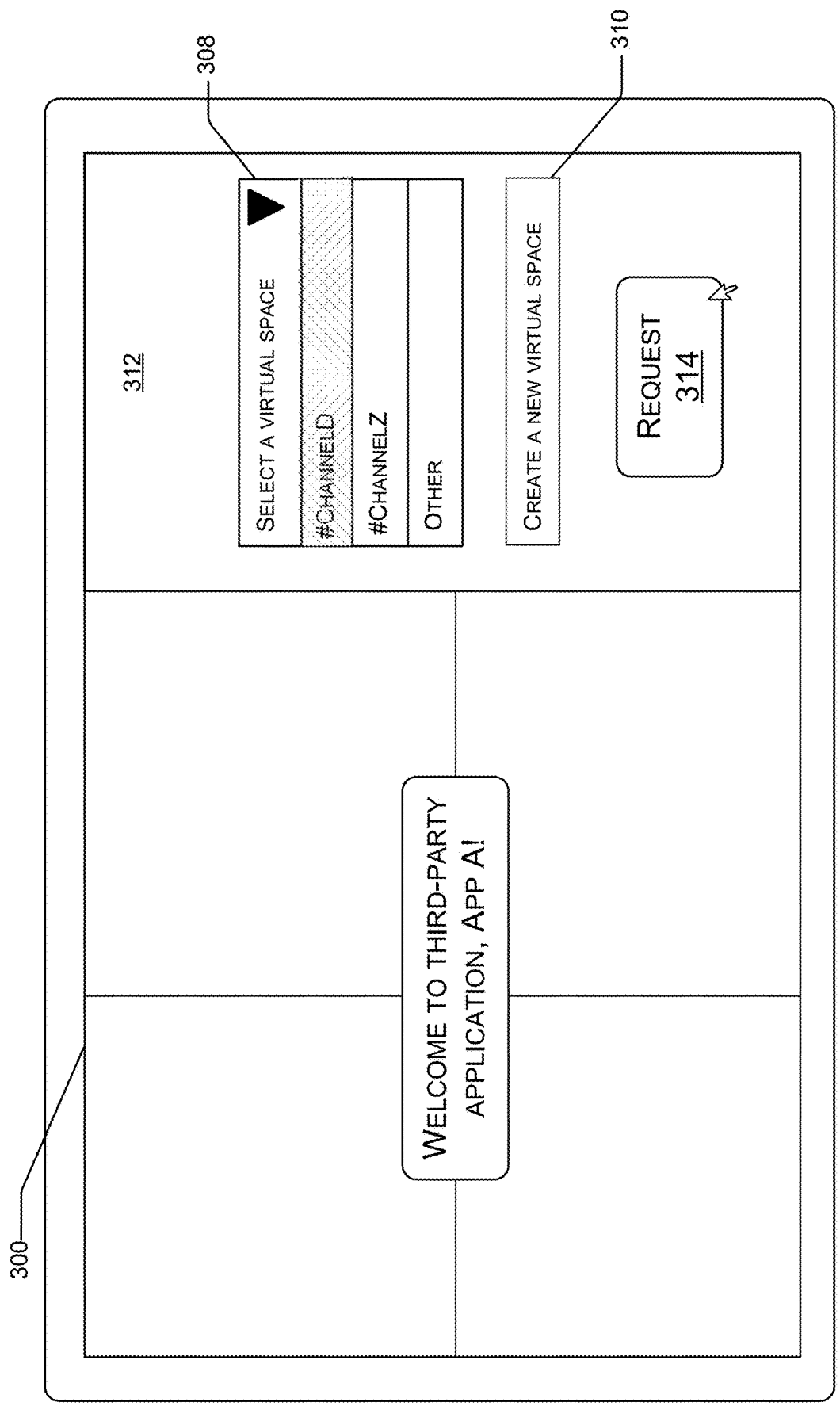
FIG. 3B illustrates an example of the user interface presented via the third-party application, as described herein, from which a user can select a virtual space to associate with the event.

In some examples, a user can opt to associate a virtual space with the new event, as illustrated in FIG. 3B. That is, an event organizer, for example, can select or create a virtual space to associate with the event so that event participants know where to collaborate on an ongoing basis. In some examples, the user interface 300 illustrated in FIG. 3B (or one similar thereto) can be presented in response to a request to associate a virtual space with the event. For example, as illustrated in FIG. 3A, the user interface 300 can include an affordance, which can be associated with a user interface element 307, to enable a user to request to add a virtual space to the event. In some examples, the user interface 300 can be updated to include one or more user interface elements 308 and/or 310 with which a user can interact to select and/or designate a virtual space to associate with the event. In some examples, the user interface element(s) 304 can be presented via a section 312 of the user interface 300 that is configured to provide functionality associated with the communication platform. That is, in some examples, the section 312 can be presented via embedded functionality associated with the communication platform. In some examples, the section 312 can be presented by the third-party application, which can be configured to exchange data with the communication platform (e.g., via SDK(s) and/or API(s)).

In at least one example, a user interface element 308, which can be a drop down or other affordance, can enable a user to select a virtual space to associate with the event. In at least one example, virtual spaces associated with the drop down can be populated based on user identifiers(s) and/or other context data associated with the event. As described above, the integration management component 116 can receive context data associated with the event and can identify one or more virtual spaces to associate with the event. In some examples, such identified virtual space(s) can be associated with a recommendation. In at least one example, such identified virtual space(s) can be presented as options for selection via the user interface element 308. In some examples, one of the options associated with the drop down can enable the user to designate a particular virtual space to associate with the event (e.g., if the particular virtual space is not listed as an option in the drop down). In at least one example, based at least in part on an interaction with the user interface element 308, an indication of the selected virtual space can be sent to the server(s) 102.

In at least one example, a user interface element 310 can enable a user to request to create a new virtual space. In such an example, based at least in part on an interaction with the user interface element 310, a request to create a new virtual space to be associated with the event can be sent to the server(s) 102.

In at least one example, the user interface 300 can include an affordance, which can be associated with a user interface element 314, that can enable the request to associate the event with a virtual space to be sent to the server(s) 102. In some examples, if the request is associated with an existing virtual space, an indication of the event can be presented via the user interface 200 of the communication platform, as illustrated in FIG. 2A. In some examples, the indication can be an invitation to join the event.

In some examples, authentication may be required to enable a virtual space to be embedded into a third-party application or other third-party platform experience. That is, in at least one example, for users to use embedded virtual spaces, such users may need to install and authenticate with both the third-party platform and the communication platform. In some examples, however, a user may not be required to do either.

Figure 3C:
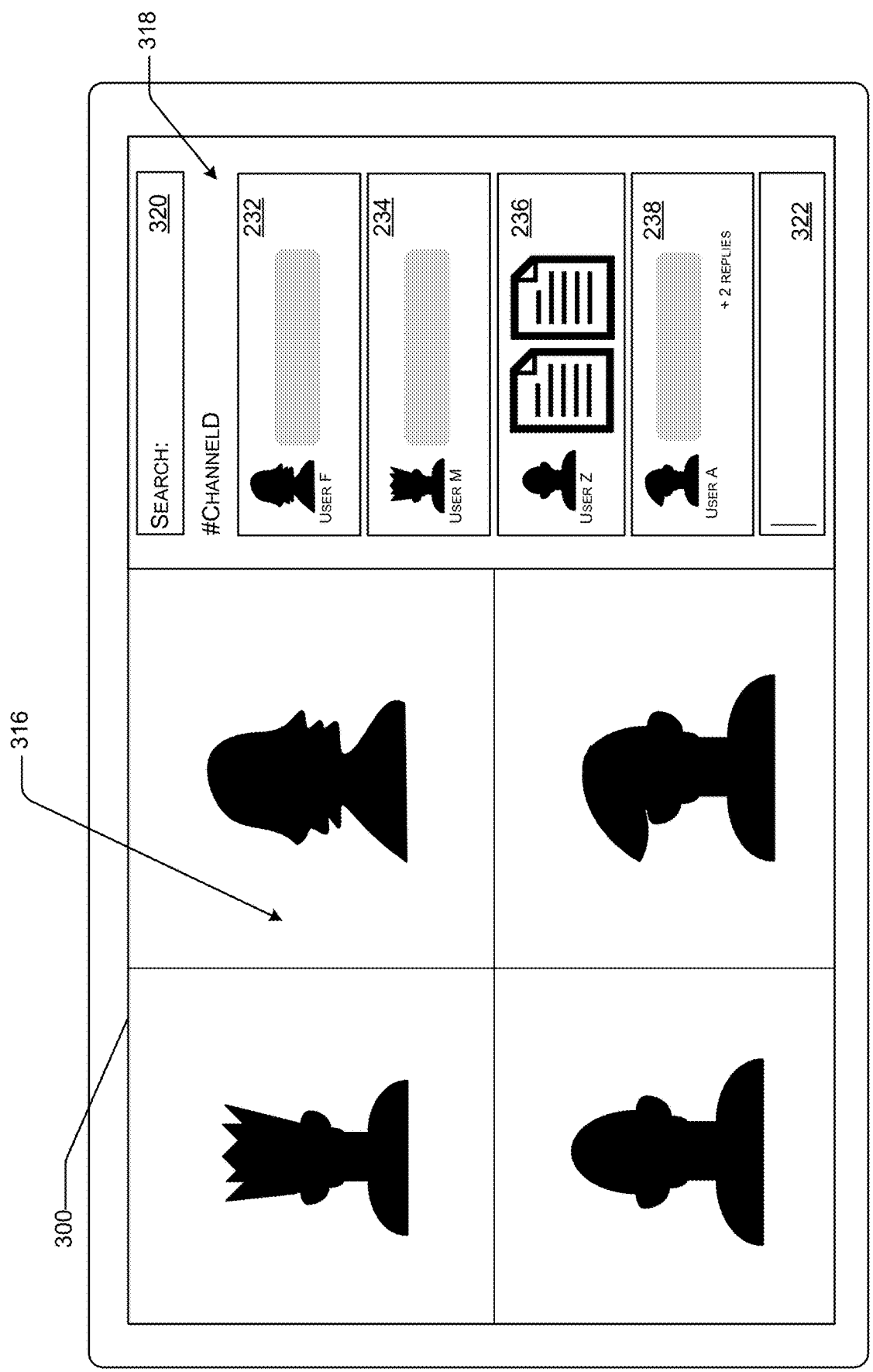
FIG. 3C illustrates an example of the user interface presented via the third-party application, as described herein, wherein a section of the user interface is configured to present at least a portion of an embedded virtual space that is associated with an event of the third-party application, as described herein.

FIG. 3C illustrates an example of the user interface 300, wherein functionality of the communication platform is embedded in the user interface 300. As illustrated in FIG. 3C, a first section 316 of the user interface 300 can present the event (e.g., the video conference) and a second section 318 of the user interface can present the embedded virtual space, or a portion thereof, associated with the event. That is, the second section 318 can present the embedded virtual space, which in FIG. 3C is Channel D. One or more messages and/or data previously exchanged via the virtual space (e.g., prior to embedding) can be presented via the second section 318. In at least one example, messages and/or data exchanged via the embedded virtual space (e.g., in association with the event) can be presented via the second section 318 in real-time or near-real time.

Messages and/or data exchanged via the embedded virtual space are represented as user interface elements 232, 234, 236, 238. In some examples, the second section 318 can include additional or alternative functionality, such as a search mechanism 320 (which can enable a user to perform a search associated with the communication platform) and/or an input mechanism 322 (which can enable the user to send a new message, add a file, or otherwise interact with the embedded virtual space). In at least one example, the embedded virtual space can enable event participants the ability to use tools available via the communication platform (e.g., shortcuts, etc.) and/or access data shared to the embedded virtual space (e.g., pinned items, files, etc.). The messages and/or data associated with the embedded virtual space can be independently interactable.

In at least one example, a user can participate in the event via the first section 316 of the user interface 300 and can exchange messages and/or data via the second section 318 of the user interface 300 without leaving the third-party application (or web browser presenting the user interface 300). In some examples, the first section 316 and the second section 318 can be presented in a tiling configuration. Based at least in part on embedding the virtual space in the third-party application (or web browser presenting the user interface 300), the user need not access the virtual space via the user interface 200 (which can be presented by a different application and/or a web browser). Based at least in part on the virtual space being embedded in the third-party application (or web browser presenting the user interface 300), users can share and unfurl files to the virtual space, exchange messages, and otherwise collaborate within an embedded virtual space of the communication platform. As such, the user can have the context of the conversation in the virtual space during the event and, in some examples, messages and/or data exchanged during the event can be presented via the user interface 200 of the communication platform during the event (e.g., in real-time) and/or after the event. That is, in at least one example, messages and/or data exchanged during the event via the embedded virtual space can persist in the virtual space after the event has concluded. In some examples, such messages and/or data can be presented in a thread associated with an object representative of the event, as illustrated in FIGS. 2B and 2C, or such messages and/or data can be presented in a feed of the virtual space (e.g., Channel D), as illustrated in FIG. 2D. In some examples, files or other data shared during the event can be associated with the virtual space in the communication platform. In some examples, a recording or other capture of the event can be associated with the virtual space in the communication platform. As such, techniques described herein can alleviate fragmented conversations, a shortcoming of existing techniques, as described above.

In at least one example, messages and/or data exchanged via the virtual space (e.g., via the communication platform) can be pushed to the embedded virtual space such that a user who is not participating in the event can post a message or other data to the virtual space and users participating in the event can access and/or interact with the message or other data without leaving the third-party platform hosting the event. That is, messages and/or other data posted to the virtual space can also be presented in an embedded virtual space (e.g., via the user interface 300).

Figure 4:
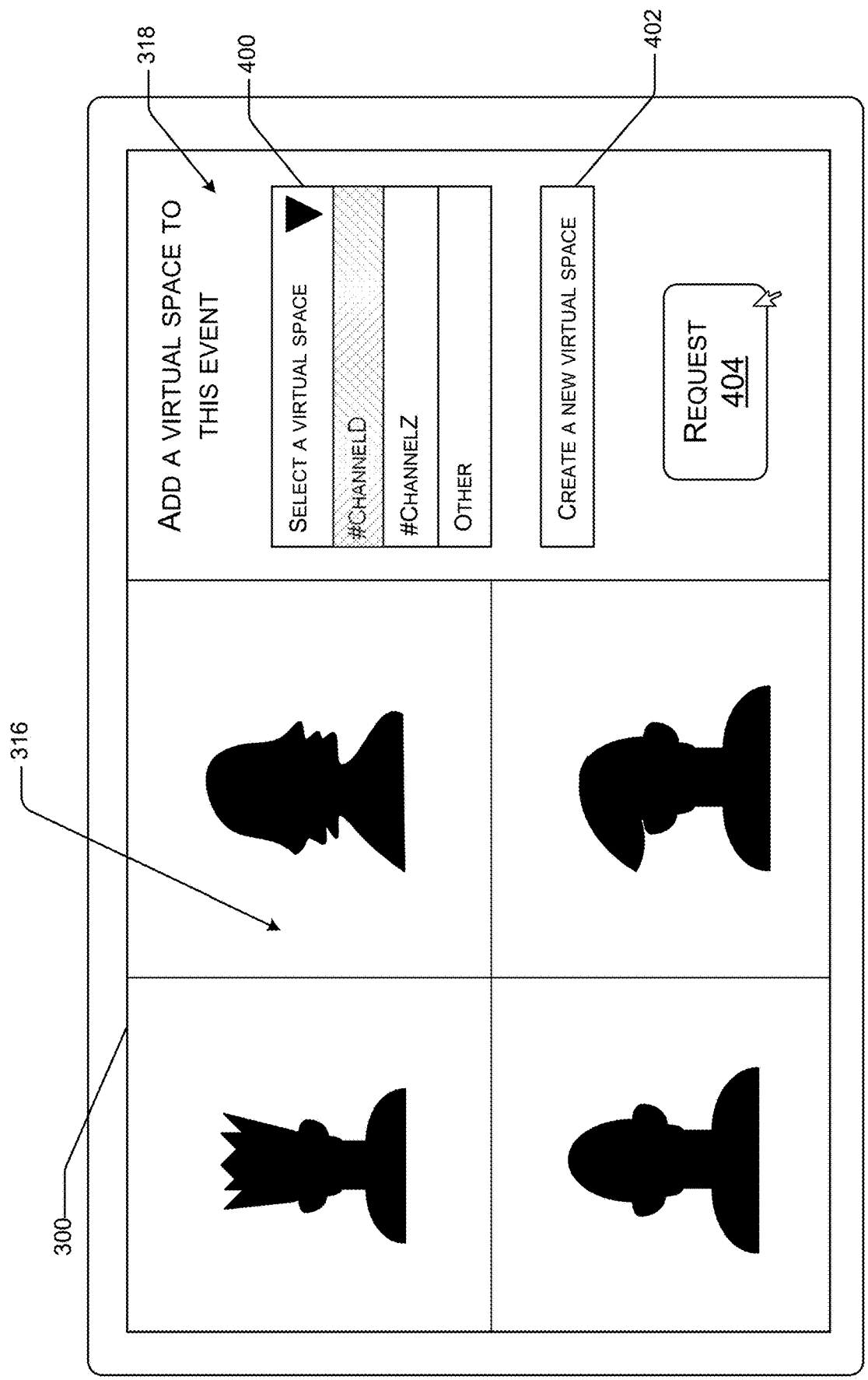
FIG. 4 illustrates an example of a user interface presented via a third-party application, as described herein, wherein a user can request to associate a virtual space with an event of the third-party application.

In some examples, an event may begin without having been associated with a virtual space prior to its beginning (e.g., after the event has been created and/or after the event has started). FIG. 4 illustrates an example of the user interface 300, wherein a user can associate a virtual space with an event via an interaction with the user interface 300.

In at least one example, the second section 318 can include one or more user interface elements 400 and/or 402, with which a user can interact to select and/or designate a virtual space to associate with the event. In at least one example, a user interface element 400, which can be a drop down or other affordance, can enable a user to select a virtual space to associate with the event. In at least one example, virtual spaces associated with the drop down can be populated based on context data associated with the event. As described above, the integration management component 116 can receive context data associated with the event and can identify one or more virtual spaces to associate with the event. Such identified virtual space(s) can be presented as option(s) for selection via the user interface element 308. In some examples, one of the options associated with the drop down can enable the user to designate a particular virtual space to associate with the event (e.g., if the particular virtual space is not listed as an option in the drop down). In at least one example, the integration management component 116 can receive a request to associate the selected virtual space with the event.

In at least one example, a user interface element 402 can enable a user to request to create a new virtual space to associate with the event. In at least one example, the integration management component 116 can receive a request to create a new virtual space and can create a new virtual space to be associated with the event.

In at least one example, the user interface 300 can include an affordance, which can be associated with a user interface element 404, that can enable the request to associate the event with a virtual space to be sent to the server(s) 102.

In at least one example, based at least in part on a virtual space being selected and associated with the event, the user interface 300 can be updated such to present the embedded virtual space via the second section 318 of the user interface as illustrated in FIG. 3C, which illustrates an example of the user interface 300 wherein the embedded virtual space (e.g., Channel D) is presented via the second section 318 of the user interface 300.

In some examples, based at least in part on the virtual space being associated with the event, users participating in the event can invite other users participating in the event to the virtual space. In some examples, such an invitation can be triggered via a tag or mention of a user from within the embedded virtual space. In some examples, an invitation can include a link to the virtual space, to invite a user to join the virtual space. In some examples, an invitation can trigger an onboarding process to onboard a user to the communication platform. In some examples, invitations can be sent as text messages, emails, in-app notifications, etc.

In some examples, an embedded virtual space can be associated with a code (e.g., a barcode, a QR code, etc.) that users can scan or otherwise capture to join the embedded virtual space. In some examples, the integration management component 116 can receive an indication of a scan or other capture, and determine whether the requesting user is associated with the communication platform and/or virtual space. If the user is not associated with the communication platform, the integration management component 116 can trigger an onboarding process to create a user account for the user. If the user is associated with the communication platform, but not the virtual space, the integration management component 116 can associate the user with the virtual space (so long as permissions allow).

FIGS. 3A-4 refer to embedding a virtual space into a third-party application, such that the user interface 300 is presented by the third-party application. However, in some examples, a virtual space can be embedded via an extension to a web browser. Techniques described herein can be similarly applicable to such an embedding; however, the user interface 300 in that example would be presented by the web browser instead of the third-party application.

FIGS. 1-4 make reference to "user interface elements." A user interface element can be any element of the user interface that is representative of an object, message, virtual space, and/or the like. A user interface element can be a text element, a graphical element, a picture, a logo, a symbol, and/or the like. In some examples, a user interface element can be presented as a pop-up, overlay, new sections of the user interface 200, a new user interface, part of another user interface element, and/or the like. In at least one example, individual of the user interface elements can be associated with actuation mechanisms. Such actuation mechanisms can make the corresponding user interface elements selectable. That is, actuation of an actuation mechanism as described herein can, in some examples, indicate a selection of a corresponding user interface element. In at least one example, the application(s) 140 can receive an indication of an interaction with a user interface element (e.g., indication of a selection and/or actuation of an actuation mechanism) and can send an indication of such to the server(s) 102. In some examples, the server(s) 102 can send data and/or instructions to the application(s) 140 to generate new user interfaces and/or update the user interface 200, as described herein.

The example user interfaces and user interface elements described above are provided for illustrative purposes. In some examples, such user interfaces and user interface elements can include additional or alternative data, which can be presented in additional or alternative configurations. That is, the user interfaces and user interface elements should not be construed as limiting.

FIGS. 5-10 are flowcharts showing example processes involving techniques as described herein. The processes illustrated in FIGS. 5-10 are described with reference to components of the environment 100 shown in FIG. 1 for convenience and ease of understanding. However, the processes illustrated in FIGS. 5-10 are not limited to being performed using the components described above with reference to the environment 100. Moreover, the components described above with reference to the environment 100 are not limited to performing the processes illustrated in FIGS. 5-10.

The processes in FIGS. 5-10 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 5-10 can be combined in whole or in part with each other or with other processes.

FIG. 5 illustrates an example process 500 for embedding functionality of a communication platform with a third-party application, as described herein.

At operation 502, the integration management component 116 can receive, from a third-party application, a request to connect to a communication platform, wherein the third-party application and the communication platform are associated with a user account of a user participating in an active session of the third-party application. In at least one example, the integration management component 116 can send and/or receive data from the third-party server(s) 123. In at least one example, a user can interact with a third-party application and/or a web browser associated with the third-party platform to generate an event and/or otherwise initiate an active session of a third-party application associated with the third-party platform. In some examples, an event can be generated by the third-party server(s) 123 and an indication of the event can be sent to the server(s) 102. The integration management component 116 can receive the indication of the event. That is, in some examples, the integration management component 116 can receive, from the third-party server(s) 123, a request to connect to the communication platform. In some examples, the request can be associated with an active session of a third-party application associated with the third-party server(s) 123. The "active session" can correspond to an event, as described above. In at least one example, a user participating in the active session and/or event can be associated with a user account of the communication platform and the third-party platform.

In at least one example, the indication of the event can include context data including but not limited to user identifier(s) associated with the event, a title of the event, a topic of the event, a description of the event, subject matter associated with the event, file(s) associated with the event, a date of the event, a time of the event, organization(s) associated with the event, group(s) associated with the event, etc. In at least one example, an event organizer (e.g., a user organizing the event) can associate one or more user identifiers of one or more users with the event. In some examples, the one or more user identifiers can comprise one or more of an email, a phone number, a username, a unique identifier, and/or the like.

At operation 504, the integration management component 116 can cause an embedded user interface associated with the group-based communication platform to be presented via a user interface of the third-party application. In at least one example, based at least in part on receiving the request to connect to the communication platform, the integration management component 116 can cause an embedded user interface to be presented via a user interface of the third-party application.

In some examples, the integration management component 116 can facilitate integration of functionality associated with the communication platform into third-party platforms. In some examples, functionality of the communication platform can be integrated into a web browser experience associated with a third-party platform. In some examples, functionality of the communication platform can be integrated into an application associated with the third-party platform (i.e., a third-party application). In some examples, such an application can be a native application, a web application, a hybrid application, and/or the like.

In some examples, the communication platform can be integrated into a third-party platform via a small software program (e.g., an extension), as described above. In some examples, an extension can be installed into a web browser through which the third-party platform is accessible. In at least one example, the extension can cause a frame, such as an iframe, to be loaded within a web browser within which the third-party platform is accessible. In some examples, the frame can access content associated with the communication platform and write content associated therewith into the frame. In some examples, the communication platform can be associated with security restrictions that limit the ability for the communication platform to be framed into an external website (e.g., a website associated with a different domain, for example). As such, in some examples, when the frame associated with the communication platform is requested, the extension can be configured to redirect to the communication platform, which can rewrite content associated with the communication platform and the third-party platform within two frames. This can provide an experience as though the user is operating within the third-party platform, but, due to the security restrictions, can be hosted by the communication platform.

In some examples, the communication platform can be integrated into the third-party platform by embedding an embeddable browser (e.g., a webview) into a third-party application associated with the third-party platform. In such examples, the third-party application can use the embeddable browser to display web content. That is, in such examples, the third-party application can have a browser engine embedded therein that can programmatically load content (e.g., associated with the communication platform) in a user interface, as described herein. In some examples, such content can be loaded into a frame, such as an iframe.

In at least one example, the integration management component 116 can cause presentation of an embedded user interface in the user interface of the third-party application. In some examples, the embedded user interface can comprise at least a portion of the virtual space, which can be determined based at least in part on context data as described above. In at least one example, data associated with the event and/or active session can be presented via a first section of the user interface (e.g., a first frame) and the embedded user interface can be presented via a second section of the user interface (e.g., a second frame). Each of the sections of the user interface can be independently interactable. As such, users associated with the event and/or active session can participate in the event (e.g., the video conference, the collaborative editing session, etc.) and exchange data and/or messages via the embedded user interface without leaving the third-party application.

As described above, in some examples, the embedded user interface can be associated with a virtual space, wherein the virtual space is associated with one or more users. In some examples, the one or more users are associated with the active session of the third-party application. In some examples, the integration management component 116 can cause the embedded user interface to be presented based at least in part on a determination that the one or more users are associated with the virtual space and the active session. In some examples, one or more other users associated with the active session of the third-party application may not be not associated with the communication platform, and in such examples, the one or more other users are permitted to view the embedded user interface but may not be permitted to perform one or more other operations (e.g., post messages or otherwise input additional or alternative data). In some examples, as described above, the integration management component 116 can invite such other user(s) to join the communication platform and can associate the other user(s) with the communication platform based at least in part on other user(s) accepting the invitation.

At operation 506, the integration management component 116 can receive, from the third-party application, data input in the embedded user interface. That is, as data and/or messages is/are input via the embedded user interface, data and/or messages can be received by the integration management component 116.

At operation 508, the integration management component 116 can cause the data input in the embedded user interface to be presented via a group-based communication user interface of the group-based communication platform. In at least one example, data and/or messages exchanged via the embedded user interface can be presented via a group-based communication user interface associated with the communication platform. That is, data and/or messages exchanged via the embedded user interface can be received by the integration management component 116 and the integration management component 116 can communicate with the channel management component 118 and/or the DM management component 119 (or other components) to cause the data and/or messages to be presented via the communication platform. In some examples, the data and/or messages can be presented in a feed associated with a virtual space of the communication platform. In some examples, the virtual space can be newly created in response to a request to create a new virtual space for the event and/or active session. In some examples, the virtual space can be a previously existing virtual space. In some examples, the data and/or messages can be presented as a thread associated with an object (e.g., a message) representative of the event.

Figure 6:
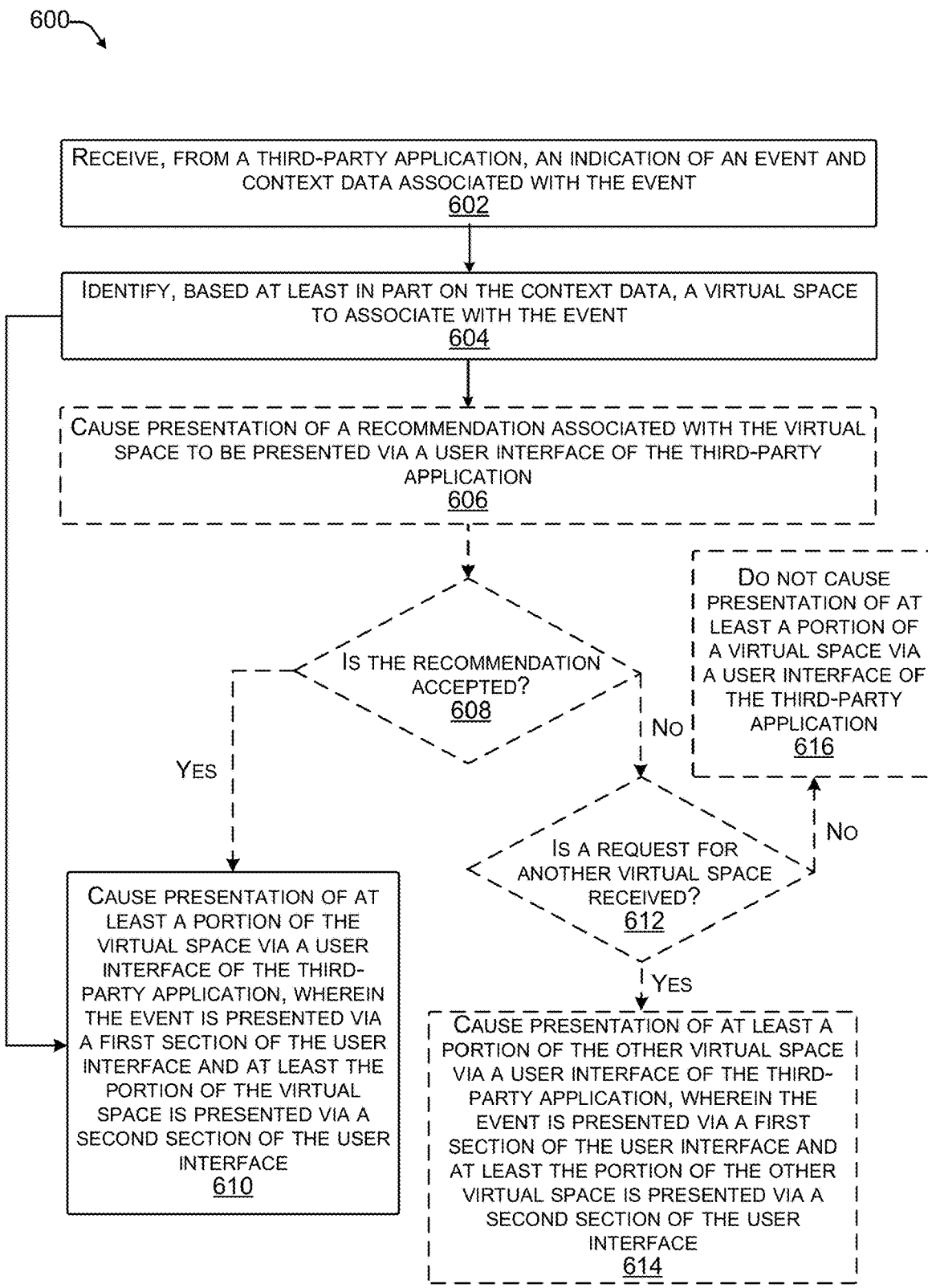
FIG. 6 illustrates an example process for associating a virtual space of a communication platform with an event of a third-party application, as described herein.

FIG. 6 illustrates an example process 600 for associating a virtual space of a communication platform with an event of a third-party application, as described herein.

At operation 602, the integration management component 116 can receive, from a third-party application, an indication of an event and context data associated with the event. In at least one example, the integration management component 116 can send and/or receive data from the third-party server(s) 123. In at least one example, a user can interact with a third-party application and/or a web browser associated with the third-party platform to generate an event. In some examples, an event can be generated by the third-party server(s) 123 and an indication of the event can be sent to the server(s) 102. The integration management component 116 can receive the indication of the event.

In at least one example, the indication of the event can include context data including but not limited to user identifier(s) associated with the event, a title of the event, a topic of the event, a description of the event, subject matter associated with the event, file(s) associated with the event, a date of the event, a time of the event, organization(s) associated with the event, group(s) associated with the event, etc. In at least one example, an event organizer (e.g., a user organizing the event) can associate one or more user identifiers of one or more users with the event. In some examples, the one or more user identifiers can comprise one or more of an email, a phone number, a username, a unique identifier, and/or the like.

At operation 604, the integration management component 116 can identify, based at least in part on the context data, a virtual space to associate with the event. In at least one example, the integration management component 116 can utilize the context data to identify a virtual space to associate with the event. In some examples, the integration management component 116 can utilize rule(s) and/or machine-trained data model(s) to analyze the context data and identify a virtual space to associate with the event.

In some examples, the integration management component 116 can utilize the user identifier(s) associated with the event to identify a virtual space to associate with the event. For example, if each of the user identifier(s) associated with an event is associated with a same virtual space (e.g., as a member of the virtual space), the integration management component 116 can identify the virtual space for association with the event. In some examples, if more than a threshold number of the user identifier(s) associated with the event are associated with a virtual space, the integration management component 116 can identify the virtual space for association with the event. That is, if a subset of the user identifier(s) is associated with a virtual space and the number of user identifier(s) associated with the subset meets or exceeds a threshold, the integration management component 116 can identify the virtual space for association with the event.

In some examples, the integration management component 116 can utilize additional or alternative context data associated with the event to identify a virtual space for association with the event. For example, the integration management component 116 can compare context data associated with the event with context data associated with individual of the virtual spaces of the communication platform to identify a virtual space to associate with the event. In some examples, a virtual space with a name that corresponds to a title, topic, description, etc. of the event can be identified for association with the event. In some examples, a virtual space associated with a file that is also associated with the event can be identified for association with the event.

In some examples, one or more data models can be trained using machine learning mechanisms (e.g., supervised, unsupervised, semi-supervised, etc.) to identify virtual spaces to associate with an event. In such examples, training data can include context data and/or user identifier(s) associated with previous events and context data and/or user identifier(s) associated with virtual spaces associated with the previous events. Trained data model(s) (i.e., machine-trained data model(s)) can output recommendations for virtual space(s) to associate with new event(s) (e.g., based on context data associated with such new event(s)). In some examples, a machine-trained data model can output an indication of a particular virtual space to associate with an event. In some examples, a machine-trained data model can output scores or metrics (e.g., relevance scores or relevance metrics) associated with individual virtual spaces. In some examples, the integration management component 116 can identify a virtual space based at least in part on a relevance score or a relevance metric associated therewith. For instance, a virtual space associated with a highest relevance score or relevance metric can be identified for association with the event.

In some examples, the integration management component 116 can identify multiple virtual spaces for association with an event. That is, in some examples, the context data associated with the event can be associated with multiple virtual spaces of the communication platform. In at least one example, the integration management component 116 can utilize relevance scores or relevance metrics such that a number of virtual spaces associated with the highest relevance scores or relevance metrics, relevance scores or relevance metrics above a threshold, and/or the like can be identified for association with the event.

In some examples, the indication of the event can include a request to associate the event with a particular virtual space of the communication platform, such as a particular channel, direct message, board, and/or the like. In some examples, the indication of the event can include a request to generate a new virtual space to be associated with the event. In at least one example, based at least in part on receiving the indication of the event, the integration management component 116 can identify a virtual space of the communication platform to associate with the event. In some examples, if the indication of the event specifies a particular virtual space, the integration management component 116 can identify the particular virtual space to associate with the event. In some examples, if the indication of the event is associated with a request to generate a new virtual space, the integration management component 116 can interact with the channel management component 118, the DM management component 119, or the like to generate the new virtual space and can identify the new virtual space to associate with the event.

At operation 606, the integration management component 116 can cause presentation of a recommendation associated with the virtual space to be presented via a user interface of the third-party application. In some examples, the integration management component 116 can cause presentation of a recommendation of one or more virtual spaces to be associated with an event via a client of a user associated with the event (e.g., the event organizer or an event participant). For example, based at least in part on receiving an indication of an event (that does not designate a particular virtual space), the integration management component 116 can analyze context data associated with the indication and generate a recommendation of one or more virtual spaces to associate with the event. In at least one example, the integration management component 116 can cause presentation of the recommendation via a user interface of a third-party application. In some examples, the recommendation can be presented via a section of the user interface that is associated with functionality of the communication platform. In some examples, the recommendation can be presented via an integration of communication platform functionality with the third-party application (e.g., via an SDK or API). In some examples, a user can interact with an affordance that enables the user to select one of the virtual spaces to associate with the event. In at least one example, the integration management component 116 can receive an indication of the selection.

At operation 608, the integration management component 116 can determine whether the recommendation is accepted. That is, in at least one example, the integration management component 116 can determine whether an indication of a selection is received.

At operation 610, the integration management component 116 can cause presentation of at least a portion of the virtual space via a user interface of the third-party application, wherein the event is presented via a first section of the user interface and at least the portion of the virtual space is presented via a second section of the user interface. In at least one example, based at least in part on identifying a virtual space and/or receiving a selection of a virtual space (e.g., acceptance of a recommendation presented at operation 506), the integration management component 116 can associate the virtual space with the event and can cause the virtual space to be presented via a user interface of the third-party application. That is, the virtual space can be embedded in the third-party application as an embedded virtual space. In at least one example, the event can be presented via a first section of the user interface (e.g., a first frame) and at least a portion of the embedded virtual space can be presented via a second section of the user interface (e.g., a second frame). Each of the sections of the user interface can be independently interactable. As such, users associated with the event can participate in the event (e.g., the video conference, the collaborative editing session, etc.) and exchange data and/or messages via the embedded virtual space without leaving the third-party application.

Data and/or messages exchanged via the embedded virtual space can be presented via a group-based communication user interface associated with the communication platform. That is, data and/or messages exchanged via the embedded virtual space can be received by the integration management component 116. The integration management component 116 can communicate with the channel management component 118 and/or the DM management component 119 (or other components) to cause the data and/or messages to be presented via the virtual space of the communication platform. In some examples, the data and/or messages can be presented in a feed associated with the virtual space. In some examples, the data and/or messages can be presented as a thread associated with an object (e.g., a message) representative of the event.

In some examples, the integration management component 116 may not cause a recommendation to be presented and the process 600 can proceed directly from operation 604 to operation 610.

At operation 612, based at least in part on determining that the recommendation is not accepted (i.e., "no" at operation 508), the integration management component 116 can determine whether a request for another virtual space is received. In some examples, a user may not accept a recommendation of a virtual space to associate with the event. In some examples, the user can provide an input via the user interface presented by the third-party application to indicate another virtual space (e.g., that exists or is to be created) that is to be associated with the event. At operation 514, based at least in part on determining that a request for another virtual space is received (i.e., "yes" at operation 612), the integration management component 116 can cause presentation of at least a portion of the other virtual space via a user interface of the third-party application, wherein the event is presented via a first section of the user interface and at least the portion of the other virtual space is presented via a second section of the user interface.

At operation 616, based at least in part on determining that a request for another virtual space is not received (i.e., "no" at operation 612), the integration management component 116 can refrain from causing presentation of at least the portion of a virtual space via a user interface of the third-party application. If no request is received to associate a virtual space with an event and/or a virtual space is not specified, the integration management component 116 can refrain from associating a virtual space with the event and can therefore refrain from causing presentation of the virtual space via the user interface presented by the third-party application.

Figure 7:
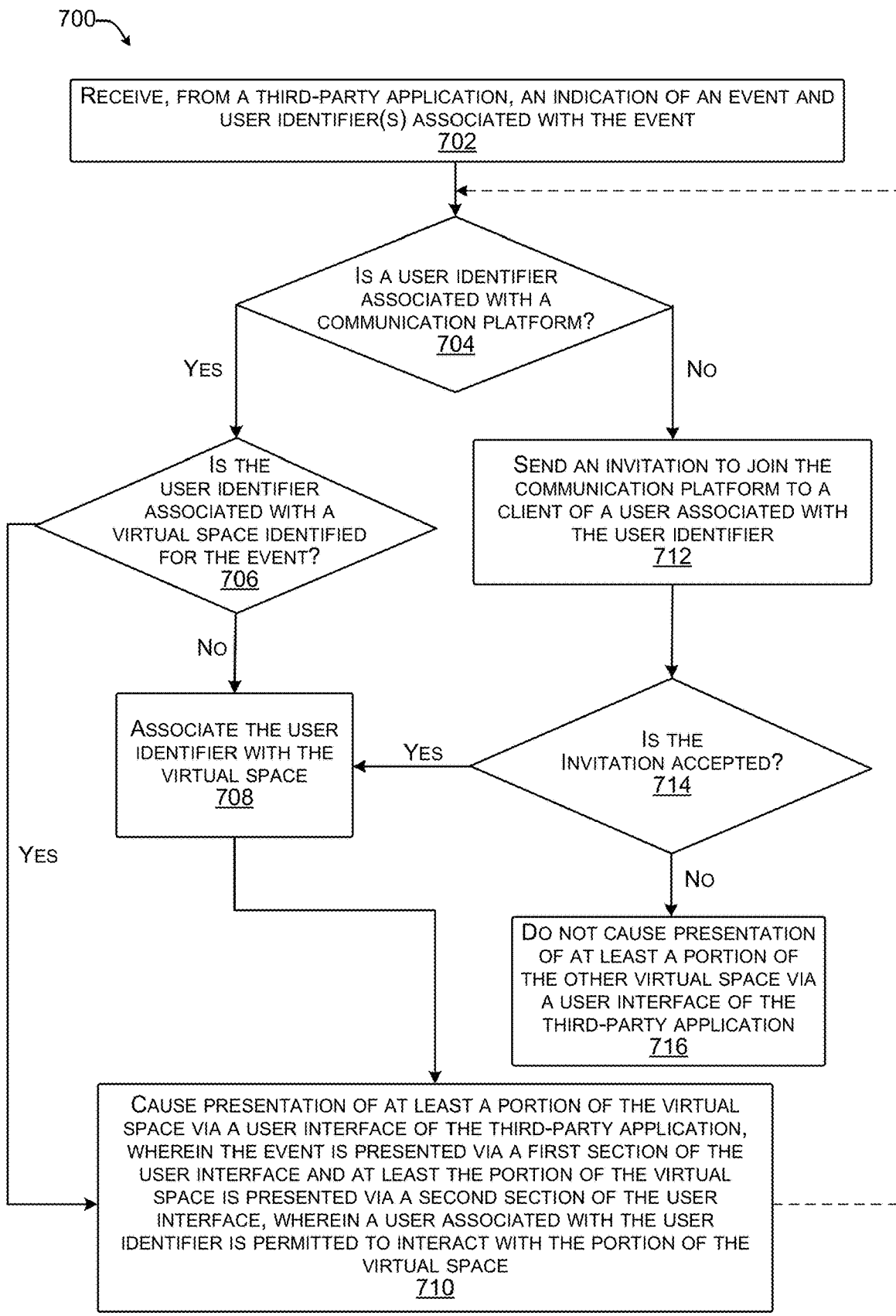
FIG. 7 illustrates an example process for associating users with a virtual space of a communication platform that is embedded in a third-party application in association with an event, as described herein.

FIG. 7 illustrates an example process 700 for associating users with a virtual space of a communication platform that is embedded in a third-party application in association with an event, as described herein.

At operation 702, the integration management component 116 can receive, from a third-party application, an indication of an event and user identifier(s) associated with the event. As described above with reference to operation 502 of FIG. 5, the integration management component 116 can receive an indication of an event from a third-party application. The indication can be associated with context data, which in some examples, can comprise user identifier(s) associated with the event.

At operation 704, the integration management component 116 can determine whether a user identifier of the user identifier(s) is associated with a communication platform. In at least one example, the integration management component 116 can receive the user identifier(s) and, for each user identifier, the integration management component 116 can compare the user identifier with the user data 124 (e.g., in the datastore 122) to determine whether the user identifier is associated with a user account. At operation 706, based at least in part on determining that the user identifier is associated with the communication platform (i.e., "yes" at operation 704), the integration management component 116 can determine whether the user identifier is associated with a virtual space identified for the event. That is, the integration management component 116 can compare the user identifier to the channel data 128, DM data 130, etc. (e.g., in the datastore) to determine whether the user identifier is associated with the virtual space. In some examples, the user data 124 can indicate which virtual spaces the user identifier is associated with.

At operation 708, based at least in part on determining that the user identifier is not associated with the virtual space (i.e., "no" at operation 708), the integration management component 116 can associate the user identifier with the virtual space. In some examples, if user identifier is not associated with the virtual space, the integration management component 116 can associate the user identifier with the virtual space (so long as permissions allow). In some examples, the integration management component 116 can send an invitation to a client of a user associated with a user identifier that is not associated with the virtual space and can associate the user identifier with the virtual space in response to receiving an indication that the user accepted the invitation. In at least one example, the process 700 can return to operation 704 for each user identifier associated with the event.

At operation 710, the integration management component 116 can cause presentation of at least a portion of the virtual space via a user interface of the third-party application, wherein the event is presented via a first section of the user interface and at least the portion of the virtual space is presented via a second section of the user interface, as described above with reference to operation 610 of FIG. 6.

At operation 712, based at least in part on determining that the user identifier is not associated with the communication platform (i.e., "no" at operation 704), the integration management component 116 can send an invitation to join the communication platform to a client of a user associated with the user identifier. In some examples, the integration management component 116 can determine that a user identifier is not associated with a user account of the communication platform. In some such examples, the integration management component 116 can initiate an onboarding process to onboard a user associated with the user identifier to the communication platform. In some examples, such an onboarding process can trigger sending of a text message, email, push notification, or other message to a client of the user, wherein the text message, email, push notification, or other message can include a link or other mechanism to facilitate onboarding. That is, the integration management component 116 can send an invitation to the client of the user associated with the user identifier.

At operation 714, the integration management component 116 can determine whether the invitation is accepted. That is, in at least one example, the integration management component 116 can determine whether the user completed the onboarding process. Based at least in part on a determination that the invitation is accepted (i.e., "yes" at operation 714), the integration management component 116 can associate the user identifier with the virtual space, as described in operation 708. In some examples, the integration management component 116 can send another invitation to the client of the user and can associate the user identifier with the virtual space in response to receiving an indication that the user accepted the invitation.

At operation 716, based at least in part on a determination that the invitation is not accepted (i.e., "no" at operation 714), the integration management component 116 can refrain from causing presentation of a virtual space via a user interface of a third-party platform. That is, if a user is not associated with the virtual space, the user may not be permitted to view the embedded virtual space and/or data associated therewith.

Figure 8:
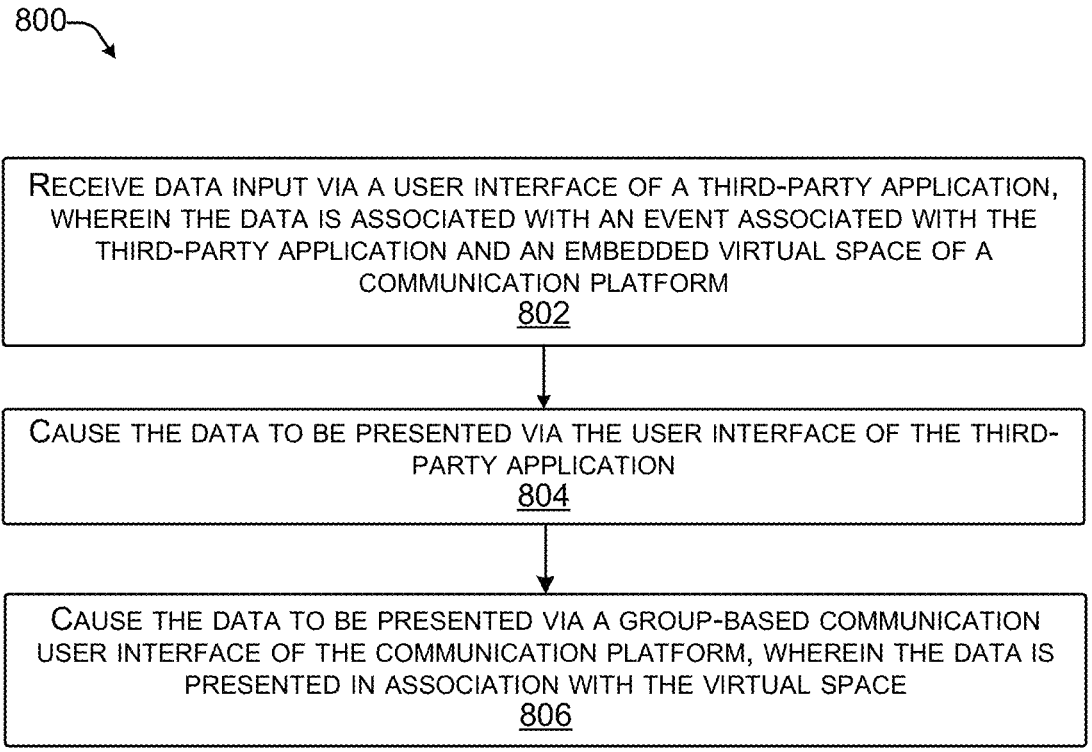
FIG. 8 illustrates an example process for causing data input via an embedded virtual space, of a communication platform, to be presented in association with the virtual space via a group-based communication interface of the communication platform, as described herein.

FIG. 8 illustrates an example process 800 for causing data input via an embedded virtual space, of a communication platform, to be presented in association with the virtual space via a group-based communication interface of the communication platform, as described herein.

At operation 802, the integration management component 116 can receive data input via a user interface of a third-party application, wherein the data is associated with an event associated with the third-party application and is input via an embedded virtual space of a communication platform.

As described above, in at least one example, based at least in part on identifying a virtual space and/or receiving a selection of a virtual space (from one or more identified virtual spaces), the integration management component 116 can associate the virtual space with an event and can cause the virtual space to be presented via a user interface of the third-party application. That is, the virtual space can be embedded in the third-party application as an embedded virtual space. In at least one example, the event can be presented via a first section of the user interface (e.g., a first frame) and at least a portion of the embedded virtual space can be presented via a second section of the user interface (e.g., a second frame). Each of the sections of the user interface can be independently interactable. As such, users associated with the event can participate in the event (e.g., the video conference, the collaborative editing session, etc.) and exchange data and/or messages via the embedded virtual space without leaving the third-party application. Data and/or messages exchanged via the embedded virtual space can be received by the integration management component 116.

At operation 804, the integration management component 116 can cause the data to be presented via the user interface of the third-party application. In at least one example, the integration management component 116 can cause the data to be presented via the user interface of the third-party application, for example, in the section associated with the virtual space. As described above, such data, which can include messages, files, links, etc. can be interactable such that users can reply to individual messages, files, links, etc., react to individual messages, files, links, etc. from within the user interface of the third-party platform (i.e., without leaving the third-party platform).

At operation 806, the integration management component 116 can cause the data to be presented via a group-based communication user interface of the communication platform, wherein the data is presented in association with the virtual space. That is, in at least one example, data, which can include messages, files, links, etc., exchanged via the embedded virtual space can be presented via a group-based communication user interface associated with the communication platform. For example, the integration management component 116 can communicate with the channel management component 118 and/or the DM management component 119 (or other components) to cause the data to be presented via the virtual space of the communication platform. In some examples, the data can be presented in a feed associated with the virtual space. In some examples, the data can be presented as a thread associated with an object (e.g., a message) representative of the event.

Figure 9:
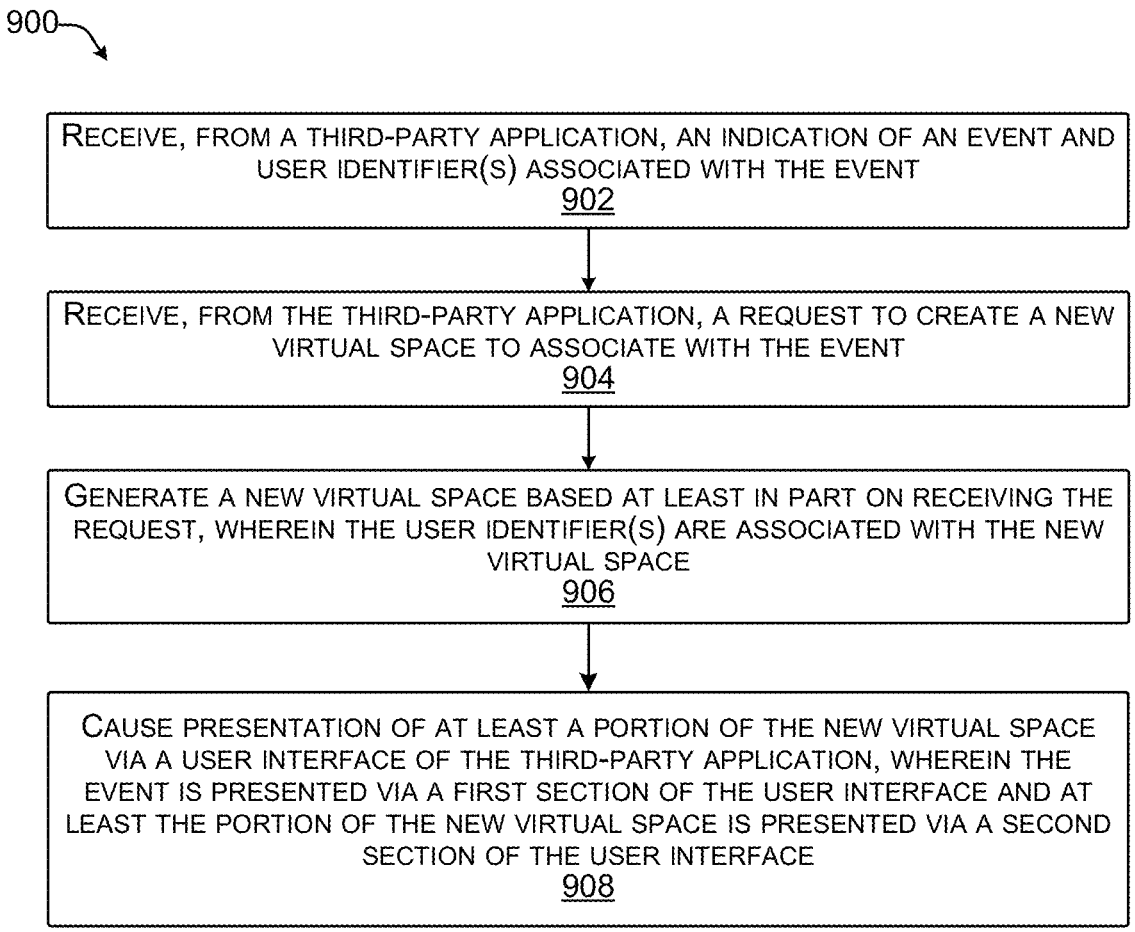
FIG. 9 illustrates an example process for generating a new virtual space and associating the new virtual space with an event of a third-party application, as described herein.

FIG. 9 illustrates an example process 900 for generating a new virtual space and associating the new virtual space with an event of a third-party application, as described herein.

At operation 902, the integration management component 116 can receive, from a third-party application, an indication of an event and user identifier(s) associated with the event. As described above with reference to operation 502 of FIG. 5, the integration management component 116 can receive an indication of an event from a third-party application. The indication can be associated with context data, which in some examples, can comprise user identifier(s) associated with the event.

At operation 904, the integration management component 116 can receive, from the third-party application, a request to create a new virtual space to associate with the event. In at least one example, a user can request creation of a new virtual space to associate with the event, for example, via an interaction with an affordance of a user interface of the third-party application. The integration management component 116 can receive the request.

At operation 906, the integration management component 116 can generate a new virtual space based at least in part on receiving the request, wherein the user identifier(s) are associated with the new virtual space. In some examples, the integration management component 116 can interact with the channel management component 118, the DM management component 119, or the like to generate the new virtual space and can associate the new virtual space with the event.

At operation 908, the integration management component 116 can cause presentation of at least a portion of the new virtual space via a user interface of the third-party application, wherein the event is presented via a first section of the user interface and at least the portion of the new virtual space is presented via a second section of the user interface, as described above with reference to operation 610 of FIG. 6.

FIG. 10 illustrates an example process 1000 for associating a virtual space with an event of a third-party application, as described herein.

At operation 1002, the integration management component 116 can cause presentation of an invitation to join an event associated with a third-party application via a virtual space of a communication platform, wherein the virtual space is associated with member(s). In some examples, an event can be generated via an integration of the third-party platform with the communication platform. For example, a user can request to generate an event from within a virtual space of the communication platform. In at least one example, an indication of the event can be presented in association with the virtual space. In some examples, the indication can be an invitation to join the event.

At operation 1004, the integration management component 116 can receive, from the third-party application, an indication of a start of the event, wherein one or more of the member(s) associated with the virtual space are associated with the event. In at least one example, when an event begins (e.g., a video conference starts, a collaborative editing session begins, etc.), the third-party application can send an indication of such to the server(s) 102. The integration management component 116 can receive the indication.

At operation 1006, the integration management component 116 can cause presentation of at least a portion of the virtual space via a user interface of the third-party application, wherein the event is presented via a first section of the user interface and at least the portion of the virtual space is presented via a second section of the user interface, as described above with reference to operation 510 of FIG. 5. In at least one example, an indication of the event can be presented in association with the virtual space and, when the event is initiated within the third-party application, the virtual space from which the request to generate the event was received can be associated with the event. That is, the integration management component 116 can identify the virtual space (e.g., based at least in part on the virtual space being associated with the request to generate the event) and can cause the virtual space to be presented via a user interface of the third-party application. As described above, the virtual space can therefore be embedded in the third-party application such that users associated with the event can participate in the event (e.g., the video conference, the collaborative editing session, etc.) and exchange data and/or messages via the virtual space without leaving the third-party application.

FIGS. 5-10 refer to embedding a virtual space into a third-party application, such that an embedded virtual space is presented via a user interface that is presented by the third-party application. However, in some examples, a virtual space can be embedded via an extension to a web browser. As such, in some examples, techniques described herein can be similarly applicable to such an embedding; however, the user interface via which the embedded virtual space is presented, in that example, would be presented by the web browser instead of the third-party application.

FIGS. 1-10 describe techniques for embedding functionality of a communication platform into a third-party platform that is accessible via an application or web browser. By embedding functionality of a communication platform (e.g., a virtual space or other object) into third-party applications, techniques described herein alleviate the need for users to switch back and forth between third-party applications and another application and/or web browser providing access to the communication platform. Such an embedding can enable users to use functionality of the communication platform from within third-party applications, without switching context or otherwise leaving the third-party applications. This can conserve computing resources by alleviating the need to run multiple applications and/or present multiple windows to enable users to participate in events and communicate via the communication platform.

As described above, in existing techniques, users can communicate via a virtual space of a communication platform prior to an event and after an event; however, to communicate via the virtual space during the event requires the user to toggle back and forth with a third-party application and an application and/or web browser providing functionality of the communication platform. If users utilize a native messaging feature associated with the third-party application, conversations via the communication platform and the third-party application are fragmented. As described above, in some examples, messages and/or other data exchanged via the embedded functionality of the communication platform can be presented via the communication platform (e.g., in a virtual space of the communication platform). That is, embedding functionality of the communication platform into third-party applications can de-fragment conversations. As such, techniques described herein, can alleviate splitting conversations across multiple platforms, leading to silos of information and unnecessary and/or extra work to share what happened in one application (e.g., the video conferencing application, the collaborative editing application, etc.) with another application (e.g., associated with the communication platform). Further, with existing techniques, each link, file, etc. shared in a third-party application has to be re-shared back to the communication platform manually to ensure no part of the conversation is lost. Techniques described herein enable links, files, etc. shared via an embedded virtual space to be automatically shared to the communication platform and stored via the communication platform. As such, techniques described herein can improve user experiences.

That is, techniques described herein enable users of a communication platform and a third-party application to message and/or otherwise collaborate with each other in virtual spaces (e.g., channels, direct messages, etc.) that they already use without needing to juggle multiple applications and/or windows. Techniques described herein, therefore, save computing resources and improve user experiences.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A method, implemented at least in part by one or more computing devices of a group-based communication platform, for embedding functionality of the group-based communication platform with a third-party application, the method comprising: receiving, from the third-party application, a request to connect to the group-based communication platform, wherein the third-party application and the group-based communication platform are associated with a user account of a user participating in an active session of the third-party application; in response to receiving the request, causing an embedded user interface associated with the group-based communication platform to be presented via a user interface of the third-party application; receiving, from the third-party application, data input in the embedded user interface; and in response to receiving the data, cause the data input in the embedded user interface to be presented via a group-based communication user interface of the group-based communication platform.

B. The method of paragraph A, wherein the embedded user interface is associated with a virtual space, wherein the virtual space is associated with one or more users, wherein the one or more users are associated with the active session of the third-party application, and wherein causing the embedded user interface to be presented based at least in part on a determination that the one or more users are associated with the virtual space and the active session.

C. The method of paragraphs A or B, wherein one or more other users associated with the active session of the third-party application are not associated with the group-based communication platform, and wherein the one or more other users are permitted to view the embedded user interface.

D. The method of paragraph C, further comprising: sending an invitation to join the communication platform to a client of at least one user of the one or more other users; and in response to receiving an indication of an acceptance of the invitation, causing the at least one user to be associated with the group-based communication platform.

E. The method of any of paragraphs A-D, wherein the data input via the embedded user interface is stored by the group-based communication platform after termination of the active session of the third-party application.

F. The method of any of paragraphs A-E, further comprising: in response to receiving the data, generating a new virtual space; and causing the data input in the embedded user interface to be associated with the new virtual space.

G. The method of any of paragraphs A-F, further comprising: in response to receiving the request to connect to the group-based communication platform, determining, based at least in part on context data associated with the request, a virtual space associated with the group-based communication platform; and causing a recommendation to associate the virtual space with the active session of the third-party application to be presented via the user interface of the third-party application; and based at least in part on receiving an indication to associate the virtual space with the active session, causing the virtual space to be presented via the embedded user interface.

H. A system associated with a group-based communication platform comprising: one or more processors; and one or more non-transitory computer-readable media storing instructions that, when executed by the one or more processors, cause the system to perform operations comprising: receiving, from a third-party application, a request to connect to the group-based communication platform, wherein the third-party application and the group-based communication platform are associated with a user account of a user participating in an active session of the third-party application; in response to receiving the request, causing an embedded user interface associated with the group-based communication platform to be presented via a user interface of the third-party application; receiving, from the third-party application, data input in the embedded user interface; and in response to receiving the data, cause the data input in the embedded user interface to be presented via a group-based communication user interface of the group-based communication platform.

I. The system of paragraph H, wherein the embedded user interface is associated with a virtual space, wherein the virtual space is associated with one or more users, wherein the one or more users are associated with the active session of the third-party application, and wherein causing the embedded user interface to be presented based at least in part on a determination that the one or more users are associated with the virtual space and the active session.

J. The system of paragraphs H or I, wherein one or more other users associated with the active session of the third-party application are not associated with the group-based communication platform, and wherein the one or more other users are permitted to view the embedded user interface.

K. The system of paragraph J, the operations further comprising: sending an invitation to join the communication platform to a client of at least one user of the one or more other users; and in response to receiving an indication of an acceptance of the invitation, causing the at least one user to be associated with the group-based communication platform.

L. The system of any of paragraphs H-K, wherein the data input via the embedded user interface is stored by the group-based communication platform after termination of the active session of the third-party application.

M. The system of any of paragraphs H-L, the operations further comprising: in response to receiving the data, generating a new virtual space; and causing the data input in the embedded user interface to be associated with the new virtual space.

N. The system of any of paragraphs H-M, the operations further comprising: in response to receiving the request to connect to the group-based communication platform, determining, based at least in part on context data associated with the request, a virtual space associated with the group-based communication platform; and causing a recommendation to associate the virtual space with the active session of the third-party application to be presented via the user interface of the third-party application; and based at least in part on receiving an indication to associate the virtual space with the active session, causing the virtual space to be presented via the embedded user interface.

O. One or more non-transitory computer-readable media storing instructions that, when executed by one or more processors, cause the one or more processors to perform operations comprising: receiving, from a third-party application, a request to connect to a group-based communication platform, wherein the third-party application and the group-based communication platform are associated with a user account of a user participating in an active session of the third-party application; in response to receiving the request, causing an embedded user interface associated with the group-based communication platform to be presented via a user interface of the third-party application; receiving, from the third-party application, data input in the embedded user interface; and in response to receiving the data, cause the data input in the embedded user interface to be presented via a group-based communication user interface of the group-based communication platform.

P. The one or more non-transitory computer-readable media of paragraph O, wherein the embedded user interface is associated with a virtual space, wherein the virtual space is associated with one or more users, wherein the one or more users are associated with the active session of the third-party application, and wherein causing the embedded user interface to be presented based at least in part on a determination that the one or more users are associated with the virtual space and the active session.

Q. The one or more non-transitory computer-readable media of paragraph O or paragraph P, wherein one or more other users associated with the active session of the third-party application are not associated with the group-based communication platform, and wherein the one or more other users are permitted to view the embedded user interface.

R. The one or more non-transitory computer-readable media of paragraph Q, the operations further comprising: sending an invitation to join the communication platform to a client of at least one user of the one or more other users; and in response to receiving an indication of an acceptance of the invitation, causing the at least one user to be associated with the group-based communication platform.

S. The one or more non-transitory computer-readable media of any of paragraphs O-R, wherein the data input via the embedded user interface is stored by the group-based communication platform after termination of the active session of the third-party application.

T. The one or more non-transitory computer-readable media of any of paragraphs O-S, the operations further comprising: in response to receiving the request to connect to the group-based communication platform, determining, based at least in part on context data associated with the request, a virtual space associated with the group-based communication platform; and causing a recommendation to associate the virtual space with the active session of the third-party application to be presented via the user interface of the third-party application; and based at least in part on receiving an indication to associate the virtual space with the active session, causing the virtual space to be presented via the embedded user interface. While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A method, implemented at least in part by one or more computing devices of a group-based communication platform, for embedding functionality of the group-based communication platform with a third-party application, the method comprising:
   receiving, from the third-party application, a request to connect to the group-based communication platform, wherein the third-party application and the group-based communication platform are associated with a user account of a user that is participating in, or that is to participate in, an event hosted by the third-party application during an active session of the third-party application, wherein the event is a virtual meeting scheduled to be attended by the user and one or more other users of the group-based communication platform;
   identifying a virtual space, of the group-based communication platform, that is to facilitate communication between the user and the one or more other users during the event based at least in part on a determination that one or more permissions associated with the group-based communication platform indicate that the user and the one or more other users are members of the virtual space and are thereby authorized to access the virtual space;
   in response to receiving the request, causing an embedded user interface representing the virtual space of the group-based communication platform to be presented via a user interface of the third-party application during the event, wherein messages communicated via the virtual space of the group-based communication platform prior to a beginning of the event are accessible to the user and the one or more other users via the embedded user interface presented during the event;
   receiving, from the third-party application, data input in the embedded user interface, the data including one or more messages exchanged with the user via the virtual space during the event and during the active session of the third-party application; and
   in response to receiving the data, cause the data input in the embedded user interface to be presented via a group-based communication user interface of the group-based communication platform such that the one or messages exchanged via the virtual space presented within the embedded user interface during the event are accessible via the virtual space of the group-based communication platform after termination of the event.

2. The method of claim 1, wherein the virtual space is associated with one or more users, wherein the one or more users are associated with the active session of the third-party application, and wherein causing the embedded user interface to be presented based at least in part on a second determination that the one or more users are associated with the virtual space and the active session.

3. The method of claim 1, wherein one or more users associated with the active session of the third-party application are not associated with the group-based communication platform, and wherein the one or more users are permitted to view the embedded user interface.

4. The method of claim 3, further comprising:
   sending an invitation to join the group-based communication platform to a client of at least one user of the one or more users; and
   in response to receiving an indication of an acceptance of the invitation, causing the at least one user to be associated with the group-based communication platform.

5. The method of claim 1, wherein the data input via the embedded user interface is stored by the group-based communication platform after termination of the active session of the third-party application.

6. The method of claim 1, further comprising:
   in response to receiving the data, generating a new virtual space; and
   causing the data input in the embedded user interface to be associated with the new virtual space.

7. The method of claim 1, further comprising:
   in response to receiving the request to connect to the group-based communication platform, determining, based at least in part on context data associated with the request, the virtual space;
   causing a recommendation to associate the virtual space with the active session of the third-party application to be presented via the user interface of the third-party application; and
   based at least in part on receiving an indication to associate the virtual space with the active session, causing the virtual space to be presented via the embedded user interface.

8. A system associated with a group-based communication platform comprising:
   one or more processors; and
   one or more non-transitory computer-readable media storing instructions that, when executed by the one or more processors, cause the system to perform operations comprising:
   receiving, from a third-party application, a request to connect to the group-based communication platform, wherein the third-party application and the group-based communication platform are associated with a user account of a user that is participating in, or that is to participate in, an event hosted by the third-party application during an active session of the third-party application, wherein the event is a virtual meeting scheduled to be attended by the user and one or more other users of the group-based communication platform;
   identifying a virtual space, of the group-based communication platform, that is to facilitate communication between the user and the one or more other users during the event based at least in part on a determination that one or more permissions associated with the group-based communication platform indicate that the user and the one or more other users are members of the virtual space and are thereby authorized to access the virtual space;
   in response to receiving the request, causing an embedded user interface representing the virtual space of the group-based communication platform to be presented via a user interface of the third-party application during the event, wherein messages communicated via the virtual space of the group-based communication platform prior to a beginning of the event are accessible to the user and the one or more other users via the embedded user interface presented during the event;
   receiving, from the third-party application, data input in the embedded user interface, the data including one or more messages exchanged with the user via the virtual space during the event and during the active session of the third-party application; and in response to receiving the data, cause the data input in the embedded user interface to be presented via a group-based communication user interface of the group-based communication platform such that the one or messages exchanged via the virtual space presented within the embedded user interface during the event are accessible via the virtual space of the group-based communication platform after termination of the event.

9. The system of claim 8, wherein the virtual space is associated with one or more users, wherein the one or more users are associated with the active session of the third-party application, and wherein causing the embedded user interface to be presented based at least in part on a second determination that the one or more users are associated with the virtual space and the active session.

10. The system of claim 8, wherein one or more users associated with the active session of the third-party application are not associated with the group-based communication platform, and wherein the one or more users are permitted to view the embedded user interface.

11. The system of claim 10, the operations further comprising:
sending an invitation to join the group-based communication platform to a client of at least one user of the one or more users; and
in response to receiving an indication of an acceptance of the invitation, causing the at least one user to be associated with the group-based communication platform.

12. The system of claim 8, wherein the data input via the embedded user interface is stored by the group-based communication platform after termination of the active session of the third-party application.

13. The system of claim 8, the operations further comprising:
in response to receiving the data, generating a new virtual space; and
causing the data input in the embedded user interface to be associated with the new virtual space.

14. The system of claim 8, the operations further comprising:
in response to receiving the request to connect to the group-based communication platform, determining, based at least in part on context data associated with the request, the virtual space;
causing a recommendation to associate the virtual space with the active session of the third-party application to be presented via the user interface of the third-party application; and
based at least in part on receiving an indication to associate the virtual space with the active session, causing the virtual space to be presented via the embedded user interface.

15. One or more non-transitory computer-readable media storing instructions that, when executed by one or more processors, cause the one or more processors to perform operations comprising:
receiving, from a third-party application, a request to connect to a group-based communication platform, wherein the third-party application and the group-based communication platform are associated with a user account of a user that is participating in, or that is to participate in, an event hosted by the third-party application during an active session of the third-party application, wherein the event is a virtual meeting scheduled to be attended by the user and one or more other users of the group-based communication platform;
identifying a virtual space, of the group-based communication platform, that is to facilitate communication between the user and the one or more other users during the event based at least in part on a determination that one or more permissions associated with the group-based communication platform indicate that the user and the one or more other users are members of the virtual space and are thereby authorized to access the virtual space;
in response to receiving the request, causing an embedded user interface representing the virtual space of the group-based communication platform to be presented via a user interface of the third-party application during the event, wherein messages communicated via the virtual space of the group-based communication platform prior to a beginning of the event are accessible to the user and the one or more other users via the embedded user interface presented during the event;
receiving, from the third-party application, data input in the embedded user interface, the data including one or more messages exchanged with the user via the virtual space during the event and during the active session of the third-party application; and
in response to receiving the data, cause the data input in the embedded user interface to be presented via a group-based communication user interface of the group-based communication platform such that the one or messages exchanged via the virtual space presented within the embedded user interface during the event are accessible via the virtual space of the group-based communication platform after termination of the event.

16. The one or more non-transitory computer-readable media of claim 15, wherein the virtual space is associated with one or more users, wherein the one or more users are associated with the active session of the third-party application, and wherein causing the embedded user interface to be presented based at least in part on a second determination that the one or more users are associated with the virtual space and the active session.

17. The one or more non-transitory computer-readable media of claim 15, wherein one or more users associated with the active session of the third-party application are not associated with the group-based communication platform, and wherein the one or more users are permitted to view the embedded user interface.

18. The one or more non-transitory computer-readable media of claim 17, the operations further comprising:
sending an invitation to join the group-based communication platform to a client of at least one user of the one or more users; and
in response to receiving an indication of an acceptance of the invitation, causing the at least one user to be associated with the group-based communication platform.

19. The one or more non-transitory computer-readable media of claim 15, wherein the data input via the embedded user interface is stored by the group-based communication platform after termination of the active session of the third-party application.

20. The one or more non-transitory computer-readable media of claim 15, the operations further comprising:

in response to receiving the request to connect to the group-based communication platform, determining, based at least in part on context data associated with the request, the virtual space;

causing a recommendation to associate the virtual space with the active session of the third-party application to be presented via the user interface of the third-party application; and based at least in part on receiving an indication to associate the virtual space with the active session, causing the virtual space to be presented via the embedded user interface.

* * * * *